United States Patent
Goldberg et al.

(10) Patent No.: US 7,685,010 B2
(45) Date of Patent: Mar. 23, 2010

(54) CONCISE COMMUNICATION OF REAL-TIME BUSINESS INFORMATION IN AN ENTERPRISE NETWORK

(75) Inventors: Evan M. Goldberg, Woodside, CA (US); Craig S. Sullivan, Kingsburg, CA (US); Baruch Goldwasser, San Francisco, CA (US); Luke A. Braud, Sunnyvale, CA (US)

(73) Assignee: Netsuite, Inc., San Mateo, CA (US)

( * ) Notice: Subject to any disclaimer, the term of this patent is extended or adjusted under 35 U.S.C. 154(b) by 1872 days.

(21) Appl. No.: 10/406,915

(22) Filed: Apr. 4, 2003

(65) Prior Publication Data

US 2004/0199541 A1 Oct. 7, 2004

(51) Int. Cl.
G06F 9/44 (2006.01)
G06F 17/00 (2006.01)

(52) U.S. Cl. .............................. 705/7; 715/204; 715/253
(58) Field of Classification Search ....................... 705/7
See application file for complete search history.

(56) References Cited

U.S. PATENT DOCUMENTS

| | | | | |
|---|---|---|---|---|
| 5,832,496 | A | * | 11/1998 | Anand et al. ................ 707/102 |
| 5,842,193 | A | * | 11/1998 | Reilly ........................... 706/45 |
| 5,926,806 | A | | 7/1999 | Marshall et al. |
| 6,025,841 | A | * | 2/2000 | Finkelstein et al. ......... 715/803 |
| 6,359,976 | B1 | * | 3/2002 | Kalyanpur et al. .......... 379/134 |
| 6,438,545 | B1 | * | 8/2002 | Beauregard et al. ............ 707/6 |
| 6,611,839 | B1 | * | 8/2003 | Nwabueze .................. 707/101 |
| 6,640,249 | B1 | | 10/2003 | Bowman-Amuah |
| 6,641,037 | B2 | * | 11/2003 | Williams ..................... 235/383 |
| 6,785,718 | B2 | * | 8/2004 | Hancock et al. ............. 709/219 |
| 6,839,702 | B1 | * | 1/2005 | Patel et al. ...................... 707/3 |
| 6,856,942 | B2 | * | 2/2005 | Garnett et al. .............. 702/183 |

(Continued)

OTHER PUBLICATIONS

"NetLedger 1 Day Test Drive Login" NetLedger. retrieved from: <testdrive.netledger.com> archived Apr. 22, 2001.*

(Continued)

*Primary Examiner*—Jonathan G. Sterrett
*Assistant Examiner*—Peter Choi
(74) *Attorney, Agent, or Firm*—Townsend and Townsend and Crew LLP

(57) ABSTRACT

A method, system, computer program product, and related business methods for concisely communicating real-time business information to end users in an enterprise network is described. An integrated business system having at least ERP and CRM functionality is accessed via a browser-based user interface. A plurality of portlet windows are simultaneously displayed within a browser window, each portlet window occupying a relatively small area therein. The portlet windows are selected and arranged according to a customizable user profile for each user, and include reporting portlets displaying up-to-date business results retrieved from the integrated business system. Each reporting portlet further comprises report access links associated with at least one of the business results that, when selected by the user, invoke browser-based displays of up-to-date business data underlying those business results. Preferably, in accordance with a user-customizable alert setting stored in the user profile, regular electronic mail messages are sent to the user communicating up-to-date versions of those business results. Preferably, data labels that identify business items within the browser-based user interface and on the electronic mails are expressed in a business vernacular tuned to each user according to customizable business vernacular settings in their user profiles.

16 Claims, 20 Drawing Sheets

U.S. PATENT DOCUMENTS

| | | | |
|---|---|---|---|
| 6,871,214 B2 * | 3/2005 | Parsons et al. | 709/206 |
| 6,999,959 B1 * | 2/2006 | Lawrence et al. | 707/5 |
| 7,007,018 B1 * | 2/2006 | Kirkwood et al. | 707/5 |
| 7,240,280 B2 | 7/2007 | Jolley et al. | |
| 7,461,077 B1 | 12/2008 | Greenwood | |
| 7,472,342 B2 | 12/2008 | Haut et al. | |
| 7,496,687 B2 | 2/2009 | Griffin et al. | |
| 2001/0034771 A1 | 10/2001 | Hutsch et al. | |
| 2002/0069204 A1 | 6/2002 | Kahn et al. | |
| 2002/0123957 A1 | 9/2002 | Notarius et al. | |
| 2002/0152399 A1 | 10/2002 | Smith et al. | |
| 2002/0169797 A1 | 11/2002 | Hegde et al. | |
| 2002/0188486 A1 | 12/2002 | Gil et al. | |
| 2002/0188513 A1 | 12/2002 | Gil et al. | |
| 2002/0198800 A1 * | 12/2002 | Shamrakov | 705/35 |
| 2003/0001885 A1 | 1/2003 | Lin et al. | |
| 2003/0033179 A1 * | 2/2003 | Katz et al. | 705/7 |
| 2003/0061482 A1 | 3/2003 | Emmerichs | |
| 2003/0157315 A1 | 8/2003 | Chowdhry et al. | |
| 2003/0158975 A1 | 8/2003 | Frank et al. | |
| 2004/0193651 A1 | 9/2004 | McLauchlin | |

OTHER PUBLICATIONS

Dragan, Richard V.; "CRM Goes Mainstream". PC Magazine. New York: Jun 12, 2001. vol. 20, Iss. 11; p. 28.*

"NetLedger Launches NetSuite, the First Online Suite That Combines ERP and CRM Functionality Aimed at Companies With Fewer Than 500 Employees". Oct. 15, 2002. Internet Retailer. retrieved from <http://www.internetretailer.com/internet/marketing-conference/566678728-netledger-launches-netsuitetm.html>.*

Wilson, Ralph F. "A Simply Way to Format HTML E-Mail Newsletters". Jan. 1, 2000. Web Marketing Today. Issue 67.*

Patricia Seybold Group, "An Executive's Guide to CRM: How to Evaluate CRM Alternatives by Functionality, Architecture, & Analytics" (2002), as printed on Mar. 27, 2003 from http://www.psgroup.com/freereport/imedia/CRM-EXECGUIDE3-02.pdf.

CIO.COM, "Executive Summaries: Enterprise Resource Planning," CXO Media, Inc. (Aug. 22, 2002), as printed on Mar. 27, 2003 from http://www.cio.com/summaries/enterprise/erp/index.html.

Ray, D. and Ray, E., *Mastering HTML and XHTML*, Sybex, Inc. (2002) (cover page and table of contents only).

Goodman, D., *JavaScript Bible: Gold Edition*, Hungry Minds, Inc. (2001). (cover page and table of contents only).

Babcock, Charles, "Isomorphic Broadens Rich Web Client Appeal," *The Foggy Mountain Report*, No. 19, San Francisco, CA, published at www.charlesbabcock.com, (Jan. 8, 2003).

Isomorphic Software, "Isomorphic SmartClient (ISC) Historical/Competitive Brief," Isomorphic Software, Inc., San Francisco, CA (Jun. 12, 2003).

Isomorphic Software, "Isomorphic SmartClient (ISC) Technology Brief," Isomorphic Software, Inc., San Francisco, CA (Jun. 10, 2003).

Novotny, Jason, et al. "Gridlab Portal Design," downloaded from http://www.gridlab.org/WorkPackages/wp-4/Documents/GridSphere.pdf, pp. Cover, 1-43 (2001).

* cited by examiner

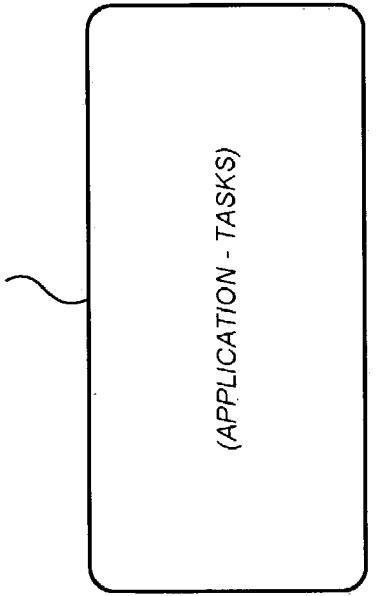
FIG. 4

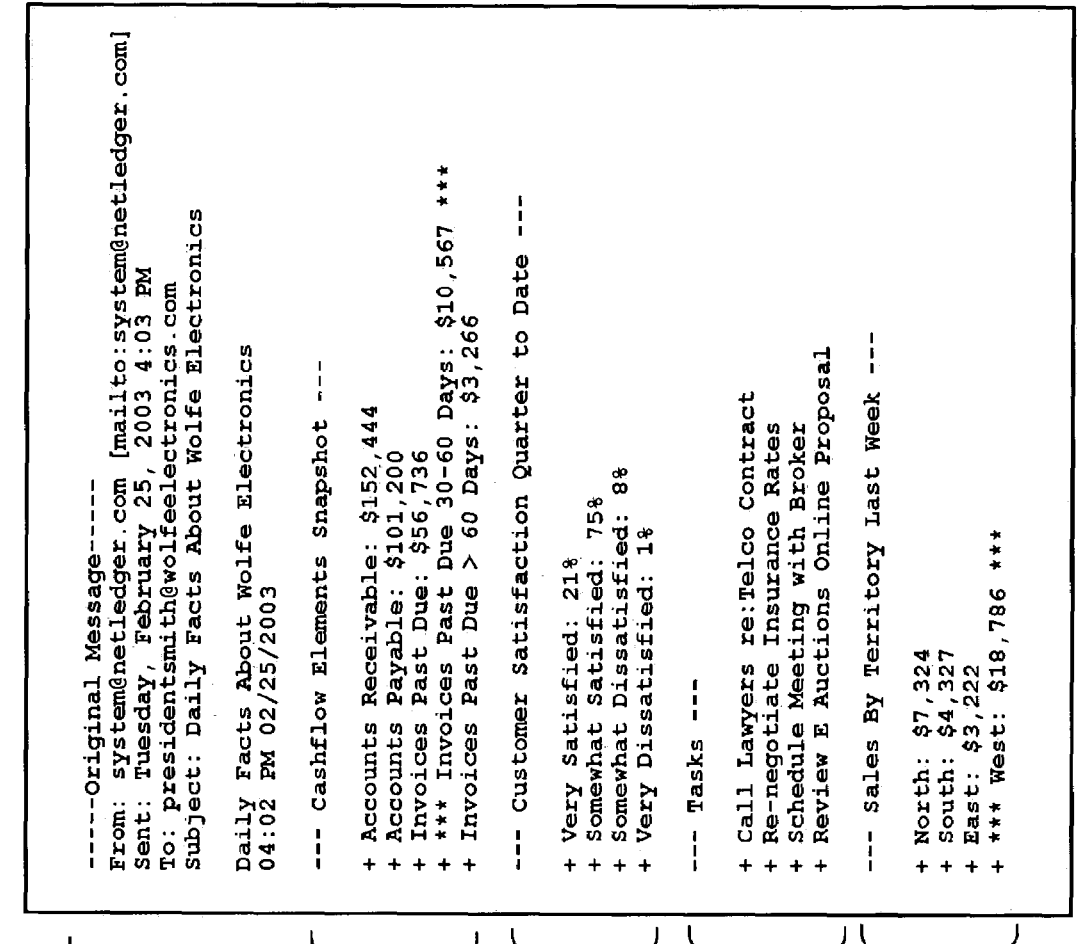

```
-----Original Message-----
From: system@netledger.com [mailto:system@netledger.com]
Sent: Tuesday, February 25, 2003 4:03 PM
To: presidentsmith@wolfeelectronics.com
Subject: Daily Facts About Wolfe Electronics Daily Facts About Wolfe Electronics
04:02 PM 02/25/2003
```
502

```
--- Cashflow Elements Snapshot ---

+ Accounts Receivable: $152,444
+ Accounts Payable: $101,200
+ Invoices Past Due: $56,736
+ *** Invoices Past Due 30-60 Days: $10,567 ***
+ Invoices Past Due > 60 Days: $3,266
```
504

```
--- Customer Satisfaction Quarter to Date ---

+ Very Satisfied: 21%
+ Somewhat Satisfied: 75%
+ Somewhat Dissatisfied: 8%
+ Very Dissatisfied: 1%
```
506

```
--- Tasks ---

+ Call Lawyers re:Telco Contract
+ Re-negotiate Insurance Rates
+ Schedule Meeting with Broker
+ Review E Auctions Online Proposal
```
508

```
--- Sales By Territory Last Week ---

+ North: $7,324
+ South: $4,327
+ East: $3,222
+ *** West: $18,786 ***
```
510

FIG. 5

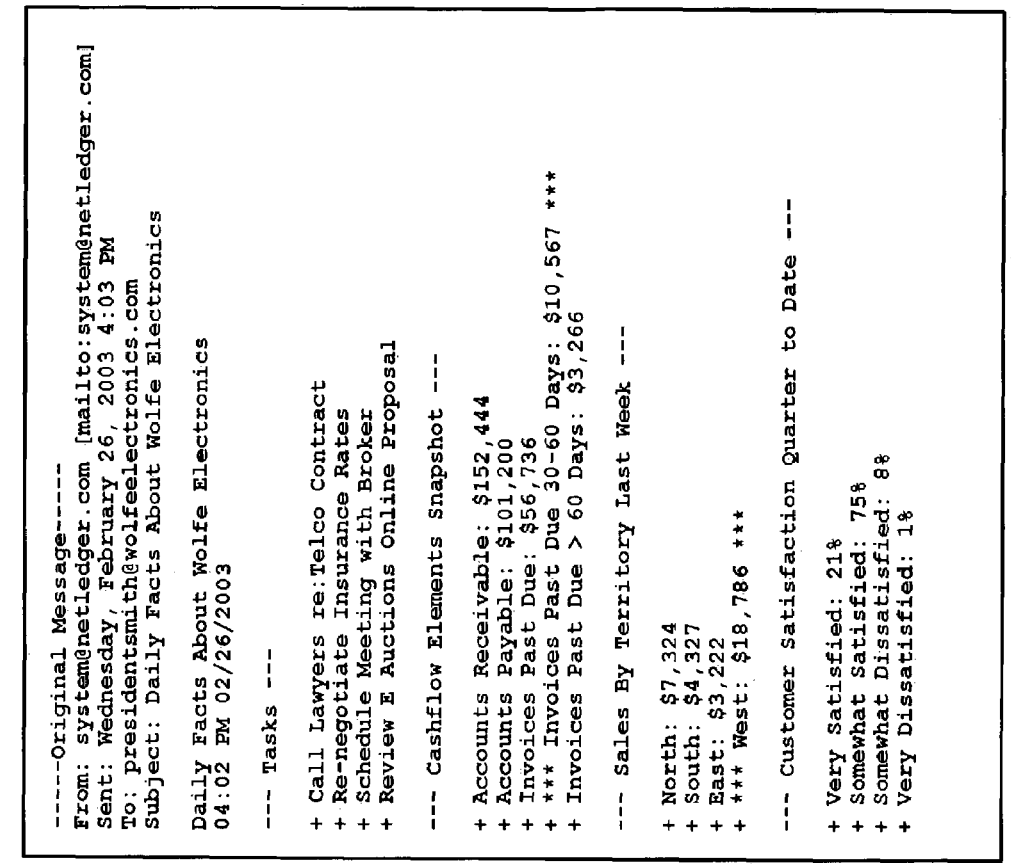

FIG. 7

```
-----Original Message-----
From: system@netledger.com [mailto:system@netledger.com]
Sent: Wednesday, February 26, 2003 4:03 PM
To: presidentsmith@wolfeelectronics.com
Subject: Daily Facts About Wolfe Electronics Daily Facts About Wolfe Electronics
04:02 PM 02/26/2003

--- Tasks ---

+ Call Lawyers re:Telco Contract
+ Re-negotiate Insurance Rates
+ Schedule Meeting with Broker
+ Review E Auctions Online Proposal --- Cashflow Elements Snapshot ---

+ Accounts Receivable: $152,444
+ Accounts Payable: $101,200
+ Invoices Past Due: $56,736
+ *** Invoices Past Due 30-60 Days: $10,567 ***
+ Invoices Past Due > 60 Days: $3,266

--- Sales By Territory Last Week ---

+ North: $7,324
+ South: $4,327
+ East: $3,222
+ *** West: $18,786 ***

--- Customer Satisfaction Quarter to Date ---

+ Very Satisfied: 21%
+ Somewhat Satisfied: 75%
+ Somewhat Dissatisfied: 8%
+ Very Dissatisfied: 1%
```

Wolfe Electronics
A/P Register
FY 2003

1102

| Date | Number | Vendor | Account | Date Due | Billed | Paid | Balance |
|---|---|---|---|---|---|---|---|
| 2000 - Accounts Payable | | | | | | | |
| 2/19/2003 | | UPS | 6170 - Postage & Delivery | 3/6/2003 | $344.25 | | ($250.00) |
| 2/22/2003 | | Pacific Bell Telephone | 6262 - Telephone Expense : Regular Service | Paid | $1,368.75 | | ($594.25) |
| 2/22/2003 | | Pacific Bell Telephone | 6262 - Telephone Expense : Regular Service | Paid | $1,260.37 | | ($1,963.00) |
| 2/22/2003 | | Pacific Bell Telephone | 6262 - Telephone Expense : Regular Service | 2/22/2003 | $1,216.22 | | ($3,223.37) |
| 2/23/2003 | To Print | Bob Ford, CPA | 1000 - Checking | | | $250.00 | ($4,439.59) |
| 2/23/2003 | To Print | Superior ISP | 1000 - Checking | | | $900.00 | ($4,189.59) |
| 2/24/2003 | To Print | Brian K Wolfe | 1000 - Checking | | | $171.70 | ($3,289.59) |
| 2/25/2003 | | American Computers | - Inventory Received Not Billed | 2/24/2003 | $4,264.80 | | ($3,117.89) |
| 2/25/2003 | 3009 | Superior ISP | 6268 - Telephone Expense : Online Fees | 2/25/2003 | $900.00 | | ($7,382.69) |
| 2/26/2003 | 3011 | Superior ISP | 6268 - Telephone Expense : Online Fees | 2/25/2003 | $900.00 | | ($8,282.69) |
| 2/26/2003 | 3013 | Superior ISP | 6268 - Telephone Expense : Online Fees | 2/26/2003 | $900.00 | | ($9,182.69) |
| 2/26/2003 | 3015 | Superior ISP | 6268 - Telephone Expense : Online Fees | 2/26/2003 | $900.00 | | ($10,082.69) |
| 2/26/2003 | 3017 | Superior ISP | 6268 - Telephone Expense : Online Fees | 2/26/2003 | $900.00 | | ($10,982.69) |
| 2/26/2003 | 3018 | Superior ISP | 6268 - Telephone Expense : Online Fees | 2/25/2003 | $900.00 | | ($11,882.69) |
| 2/26/2003 | 3019 | Superior ISP | 6268 - Telephone Expense : Online Fees | 2/25/2003 | $900.00 | | ($12,782.69) |
| 2/26/2003 | | Superior ISP | 6268 - Telephone Expense : Online Fees | Paid | $900.00 | | ($13,682.69) |
| 2/26/2003 | | Superior ISP | 6268 - Telephone Expense : Online Fees | 2/25/2003 | $900.00 | | ($14,582.69) |
| 2/26/2003 | | Superior ISP | 6268 - Telephone Expense : Online Fees | 2/28/2003 | $900.00 | | ($15,482.69) |
| 3/5/2003 | To Print | Maxson Waste Management | 1000 - Checking | | | $80.00 | ($16,382.69) |
| 3/5/2003 | To Print | Pacific Bell Telephone | 1000 - Checking | | | $1,260.37 | ($16,302.69) |
| 3/5/2003 | 3007 | Bob Ford, CPA | 6182 - Professional Fees : Accounting | 3/4/2003 | $350.00 | | ($15,042.32) |
| 3/5/2003 | | Federal Express | 6170 - Postage & Delivery | 3/7/2003 | $8.00 | | ($15,392.32) |
| 3/5/2003 | | Steele & Frock Law Offices | 6184 - Professional Fees : Legal | 3/7/2003 | $150.00 | | ($15,400.32) |

NETSUITE

Home | Transactions | Lists | Reports | Setup | Support | Intranet

Transactions >

Sign Out | Help [ Search ]

Wolfe Electronics - Test Drive User (Administrator)   1504

Search Transactions
- Type
- Date
- Name
- Number
- [ Search ]

Settings
- Customize Page
- Set Preferences

Welcome to the NetSuite Test Drive!
Getting started with NetSuite is easy. Click _here_ for more details

1502

Transactions

Bank
- Write Checks  List
- Make Deposits  List
- Transfer Funds  List
- Use Credit Card  List
- Reconcile Bank Statement
- Reconcile Credit Card Statement
- Import Online Banking QIF File
- Online Bank Statement

Purchases/Vendors
- Enter Purchase Orders  List
- Receive Purchase Order  List
- Bill Purchase Orders
- Enter Bills  List
- Pay Bills  List
- Pay Single Vendor  List
- Enter Vendor Credits  List
- Pay Sales Tax  List
- Pay Payroll Liabilities  List

Sales
- Create Opportunities  List  Search
- Prepare Estimates  List
- Enter Sales Orders  List
- Approve Sales Orders
- Fulfill Sales Order  List
- Bill Sales Orders
- Create Invoices  List
- Enter Cash Sales  List
- Create Statement Charges  List

Customers
- Accept Customers Payments  List
- Issue Customers Refund  List
- Issue Return Authorizations  List
- Approve Return Authorizations
- Receive Returned Order  List
- Refund Returns
- Issue Credit Memos  List
- Refund Cash Sales  List
- Assess Finance Charges  List
- Generate Statements
- Individual Statement

Employees
- Enter ExpenseWasteReports  List
- Track Time  Search
- Weekly Time Sheet
- Approve Time
- Enter Payroll YTD Amounts  List
- Process Payroll
- Individual Paychecks  List

Other
- Make Journal Entries  List
- Search Transactions
- Saved Transaction Searches
- View Audit Trail
- Print Checks and Forms
- Enter Opening Balances
- Set Up Budgets
- Establish Quotas
- Edit Forecasts
- Import XML Document

Inventory   1506
- Build Assemblies  List
- Unbuild Assemblies  List
- Adjust Inventory  List
- Adjust Inventory Worksheet  List
- Distribute Inventory  List
- Transfer Inventory  List

FIG. 17

NETSUITE™

Home | Transactions | Lists | Reports | Support | Intranet

Sign Out | Help | [Search]

Wolfe Electronics - Test Drive User (CEO)

Reports >

Welcome to the NetSuite Test Drive!
Getting started with NetSuite is easy. Click here for more details

Reports

1702

Saved Reports
- All Saved Reports

Financial
- Income Statement - Standard
- Income Statement - Detail
- Income Statement - Year To Date Comparison
- Income Statement - Prior Year Comparison
- Balance Sheet - Standard
- Balance Sheet - Detail
- Balance Sheet - Prior Year Comparison
- General Ledger
- Trial Balance
- Chart of Accounts
- Income Graph
- Expense Graph
- Net Worth Graph

Banking/Budgeting
- Bank Register

Sales
- Sales by Customers Summary
- Sales by Customers Detail
- Sales by Item Summary
- Sales by Item Detail
- Sales by Sales Rep Summary
- Sales by Sales Rep Detail
- Sales Order Register
- Open Sales Orders
- Sales Orders Pending Fulfillment
- Shipping Report
- Sales Back Order Report

Customers/Receivables
- A/R Aging Summary
- A/R Aging Detail
- A/R Register
- Open Invoices
- Estimates Register
- Open Estimates

Purchases
- Purchase by Vendor Summary
- Purchase by Item Summary
- Purchase by Vendor Detail
- Purchase by Item Detail
- Purchase Order Register
- Open Purchase Orders

Vendors/Payables
- A/P Aging Summary
- A/P Aging Detail
- A/P Register
- Open Bills

Inventory/Items
- Inventory Profitability
- Inventory Stock Status By Item
- Physical Inventory Worksheet
- Inventory Valuation Summary
- Inventory Valuation Detail
- Inventory Revenue Summary
- Inventory Revenue Detail
- Inventory Back Order Report
- Inventory Activity Detail
- Items Pending Fulfillment

Employees/HR
- Unapproved ExpenseWasteReports

Sales Force Automation
- Pipeline
- Prospect Analysis Summary
- Prospect Analysis Detail
- Closed Deal Analysis Summary
- Closed Deal Analysis Detail
- Leads by Lead Source Summary
- Leads by Lead Source Detail
- Prospects by Lead Source Summary
- Prospects by Lead Source Detail
- Customerses by Lead Source Summary
- Customerses by Lead Source Detail
- Sales by Promotion Code Summary
- Sales by Promotion Code Detail
- Sales Forecast vs. Quota
- Sales Forecast Detail by Sales Rep
- Open Opportunities by Sales Rep

Job/Time Tracking
- Customers Profitability Summary
- Customers Profitability Detail
- Time by Employee Summary
- Time by Employee Detail
- Time by Job Summary
- Time by Job Detail
- Time by Employee Detail
- Time by Item Summary
- Time by Item Detail

Partners
- Leads by Partner Summary
- Leads by Partner Detail
- Prospects by Partner Summary
- Prospects by Partner Detail
- Customerses by Partner Summary
- Customerses by Partner Detail
- Sales by Partner Summary
- Sales by Partner Detail

| Snapshots | ⊗ |
|---|---|
| ↑ Sales This Year | $71,550.37 |
| Last Year Comparison | $61,588.95 |
| ↑ Bank Balance | $90,877.44 |
| ↑ Receivables | $61,096.22 |
| ↑ Payables | $14,903.95 |
| ↑ Orders This Year | 515 |
| Last Year to Date | 505 |
| ↑ Open Cases | 9 |
| ↑ New Cases This Quarter | 29 |
| Last Qtr To Date | 22 |
| ↑ Closed Cases This Quarter | 17 |
| Last Qtr To Date | 15 |
| ↑ New Leads This Year | 24 |
| Last Year to Date | 30 |
| ↑ Open Prospects | 26 |
| ↑ Forecast This Year | $130,057.45 |
| Last Year | $90,642.65 |
| ↑ Web Site Hits This Year | 4,002 |
| Last Year to Date | 2,299 |

↑ Update     ↑ Set Up

FIG. 20

CONCISE COMMUNICATION OF REAL-TIME BUSINESS INFORMATION IN AN ENTERPRISE NETWORK

FIELD

This patent specification relates to business management software and systems. More particularly, this patent specification relates to a method, system, computer program product, and related business methods for concise communication of real-time business information to end users in an enterprise network.

BACKGROUND

The ability of business users to access crucial business information has been greatly enhanced by the proliferation of IP-based networking together with advances in object oriented Web-based programming and browser technology. Using these advancements, systems have been developed that permit web-based access to business information systems, thereby allowing any user with a browser and an Internet or intranet connection to view, enter, or modify the required business information.

On a roughly similar timeline, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system can include: accounting, order processing, time and billing, inventory management, employee management/payroll, and employee calendaring and collaboration, as well as reporting and analysis capabilities relating to these functions.

In a related movement, substantial efforts have also been directed to integrated Customer Relationship Management (CRM) systems, with a view toward obtaining a better understanding of customers, enhancing service to existing customers, and acquiring new, profitable customers. By way of example, the capabilities or modules of a CRM system can include: sales force automation (SFA), marketing automation, contact list, call center support, and web-based customer support, as well as reporting and analysis capabilities relating to these functions. With differing levels of overlap with ERP/CRM initiatives and with each other, substantial efforts have also been directed toward development of increasingly integrated partner and vendor management systems, web store/e-commerce systems, Product Lifecycle Management (PLM) systems, and Supply Chain Management (SCM) systems.

As known in the art, both functional advantages and strategic advantages are gained through a the use of an integrated business system comprising ERP, CRM and other business capabilities, particularly where the integrated business system offers a thin-client, browser-based user interface. Functionally, for example, a remote sales person can enter a sales transaction into their browser-based interface reflecting the successful sale of an item, whereupon the integrated business system can not only update accounts receivable, inventory databases, and other ERP-based systems, but can also automatically update commission schedules, strategic customer information databases, and other CRM-based systems. The integrated business system can also send a trigger, for example, for a vendor to send more inventory to replace sold items, and can send a corresponding message to the company warehouse to expect the incoming shipment. Strategically, integrated reporting capabilities of the above systems allow executives and managers to view current information from virtually any location, the information ranging from lists of the top performing sales people and the most lucrative customers to inventory levels and available warehouse space, so that timely changes or adjustments can be made to optimize performance across the enterprise.

Generally speaking, business software industry analysts expect that efforts toward the integration of the above systems will continue, with the goal of allowing clients to optimize the acquisition, dissemination, and use of business knowledge across enterprise functions. From an ERP perspective, AMR Research predicts that "ERP vendors will soon derive most of their revenues from adding customer relationship management (CRM), supply chain management (SCM), and product lifecycle management (PLM) capabilities." CIO.com, "*Executive Summaries: Enterprise Resource Planning,*" CXO Media, Inc. (Aug. 22, 2002). From a CRM perspective, Patricia Seybold Group characterizes a so-called "fourth wave" of CRM development as follows: "Fourth-wave solutions also begin to tie together customer self-service via the Web with customer service through the contact center. Customers can now begin an interaction online and then pick up the phone and have some hope that the call center rep will be able to see their Web interaction and help them complete the transaction. In this fourth wave, most CRM buyers are also scrambling to tightly integrate their CRM systems with their ERP and other back-end operational systems. . . . Every ERP supplier is now also a CRM supplier." Patricia Seybold Group, "*An Executive 's Guide to CRM: How to Evaluate CRM Alternatives by Functionality, Architecture,* & *Analytics*" (2002).

However, with respect to individual end users, problems can arise as integrated business systems grow ever more powerful and cross-functional. A first problem relates generally to an "information bottleneck" that can occur directly at the user interface of the system. Even if all of the internal bottlenecks of a business information system have been resolved, with information flowing freely and effortlessly among different system modules and enterprise databases, the increasingly large body of available business information has little utility to end users if they cannot efficiently perceive that business information. A related problem is that of "information overload" that can result from the wide array of information and capabilities offered to end users, especially business executives. In one scenario, executive users may find an integrated business system to be so "intimidating" as to avoid adopting the system altogether. In another scenario, even sophisticated users may avoid adopting or fully using the integrated business system if access to the information is considered to be awkward or unnecessarily time-consuming.

Another problem that arises with the introduction of more powerful, centralized business information systems relates to business nomenclatures. In particular, depending on the particular industry in question, different business functions within an enterprise may have been using different names to refer to the same business item or category. By way of example, sales people might prefer to use the term "quote" while accounting people might prefer to use the term "estimate." This difference may have historically presented no problem where the ERP/accounting systems were distinct from the CRM/SFA systems. However, the new introduction of an integrated ERP/CRM business system might force an enterprise-wide choice between competing terminology sets, leaving at least some of the users with undesired or unfamiliar terminology in the user interface. Geographic differences may also account for different terminology sets within the same business function, e.g., "accounts receivable" and "accounts payable" may be preferred in one location while "debtors" and "creditors" is preferred in another location.

Accordingly, it would be desirable to provide an integrated business information system that facilitates efficient user perception of real-time business information.

It would be further desirable to provide a user interface to an integrated business information system that allows business executives to perceive overviews of key business performance metrics in a single glance.

It would be still further desirable to provide such a user interface that also permits rapid drill-down access to data underlying the overviews of the key business performance metrics.

It would be still further desirable to provide such a user interface that offers other pathways to efficient dissemination and perception of the key business information.

It would be even further desirable to provide an integrated business information system that integrates functional, geographic, demographic, or other nomenclature differences therein while still retaining the original advantages of business system integration.

SUMMARY

A method, system, computer program product, and related business methods are provided for concisely communicating real-time business information to end users in an enterprise network. In one preferred embodiment, an integrated business system having at least ERP and CRM functionality is provided in conjunction with a browser-based user interface, the browser-based user interface displaying a plurality of portlet windows within a browser window, each portlet window occupying a relatively small area within the browser window. The plurality of portlet windows are selected and arranged according to a customizable user profile for each user, and include reporting portlets displaying up-to-date business results retrieved from the integrated business system. Each reporting portlet further comprises report access links associated with at least one of the business results being displayed. When selected by the user, each report access link invokes a browser-based display of up-to-date business data underlying that business result, thereby allowing immediate drill-down capability into that business result. Preferably, in accordance with a user-customizable alert setting stored in the user profile, the integrated business system transmits electronic mail messages to the user containing the up-to-date business results that would be displayed by the reporting portlets at the time the electronic mail message is sent. Preferably, data labels within the browser-based user interface and on the electronic mails that identify business items are expressed in a business vernacular tuned to that user according to customizable vernacular settings in their user profile.

In one preferred embodiment, the integrated business system is hosted by a third party application service provided (ASP) separate from any facilities of the business enterprise and accessed by users over the Internet. In one preferred embodiment, the browser window containing the selection and arrangement of portlets is displayed any time a homepage or "dashboard" link is selected by the user, and the business results therein are refreshed upon said selection via query to the integrated business information system. In an alternative preferred embodiment, the business results are updated at regular time intervals according to a setting in the user profile. In still another preferred embodiment, portlets are updated on an individual basis depending on the nature of their contents, and/or upon mouse rollover or other individual event. Preferably, the ERP capabilities or modules of the integrated business system include accounting, order processing, time and billing, inventory management, employee management/payroll, and employee calendaring/collaboration. Preferably, the CRM capabilities or modules of the integrated business system include sales force automation (SFA), marketing automation, contact list, call center support, and web-based customer support. In another preferred embodiment, the integrated business system further comprises an integrated partner/vendor management module, a web store/e-commerce module, a PLM module, and/or an SCM module.

According to a preferred embodiment, the plurality of portlet windows further comprises one or more application portlets comprising at least one application access link that, when selected by the user, invokes a browser-based interactive session with an ERP and/or CRM module of the integrated business system. The plurality of portlets further comprises a continuing search results portlet displaying results associated with a continuing search request, and a user interface management portlet comprising at least one customization access link that, when selected by the user, invokes a browser-based interactive session a customization module that acquires various user preferences from the user and assigns them to the user profile. Preferably, a predefined role relevant to the business enterprise is assigned to each user, such as CEO, sales manager, accountant, etc. For each predefined role there is a default user profile containing settings, permissions, and other preferences pre-customized for that role. Included in the default user profile are portlet selection and arrangement settings, business metric selections, e-mail alert settings, and default vernacular settings pre-customized to that role by a vendor of the integrated business system. With the general exception of permission settings, many of the default preferences are further customizable by the user.

In one preferred embodiment, the e-mail alert settings may be adjusted by the user to select a preference between receiving graphically-expressed business result metrics in their electronic mail messages versus receiving text-only e-mail messages. When graphically received, the electronic mail message is formed from a markup language so as to emulate the appearance and arrangement of the browser window of the user interface. When received in text-only format, the electronic mail message places the text in a sequence dictated by the user's arrangement of portlet windows in the browser window of the user interface. Business metrics exceeding predefined thresholds may be highlighted in the browser-based user interface portlets and/or the electronic mail messages according to user preferences.

In another preferred embodiment, each user is associated with one of a plurality of predefined business vernacular groups for the business enterprise. Each business vernacular group is associated with a terminology map that provides, for each of a set of static business terms fixedly identifying a respective set of business information items maintained by the integrated business system, a vernacular equivalent terms tuned for that business vernacular group. When displaying or e-mailing business data to that user, the terminology of that user's business vernacular group is substituted for the static business terms, thereby making a greater number of users comfortable with their user interface into the integrated business system. Preferably, defaults are provided to users based on pre-assigned roles within the enterprise. In other preferred embodiments, customized vernacular terminology maps may be provided based on geography, demographic group, or any of a variety of other groupings.

BRIEF DESCRIPTION OF THE DRAWINGS

FIG. 4 illustrates an arrangement of portlet windows associated with the interactive browser-based interface of FIG. 3;

FIG. 5 illustrates an electronic mail message transmitted from an integrated business system to an end user according to a preferred embodiment;

FIG. 7 illustrates an electronic mail message corresponding to the rearranged portlet windows of FIG. 6;

FIG. 11 illustrates business data underlying a business result displayed in a result portlet of FIG. 10;

FIG. 12 illustrates a search parameter entry screen associated with a saved search portlet of FIG. 10;

FIG. 15 illustrates a transaction page for a different end user than the transaction page of FIG. 14;

FIG. 17 illustrates a reports page of an interactive browser-based user interface to an integrated business system according to a preferred embodiment;

FIG. 19 illustrates a user profile customization page including a portlet customization page according to a preferred embodiment; and FIG. 20 illustrates a reporting portlet corresponding to entries displayed in the portlet customization page of FIG. 19.

DETAILED DESCRIPTION

Figure 1:
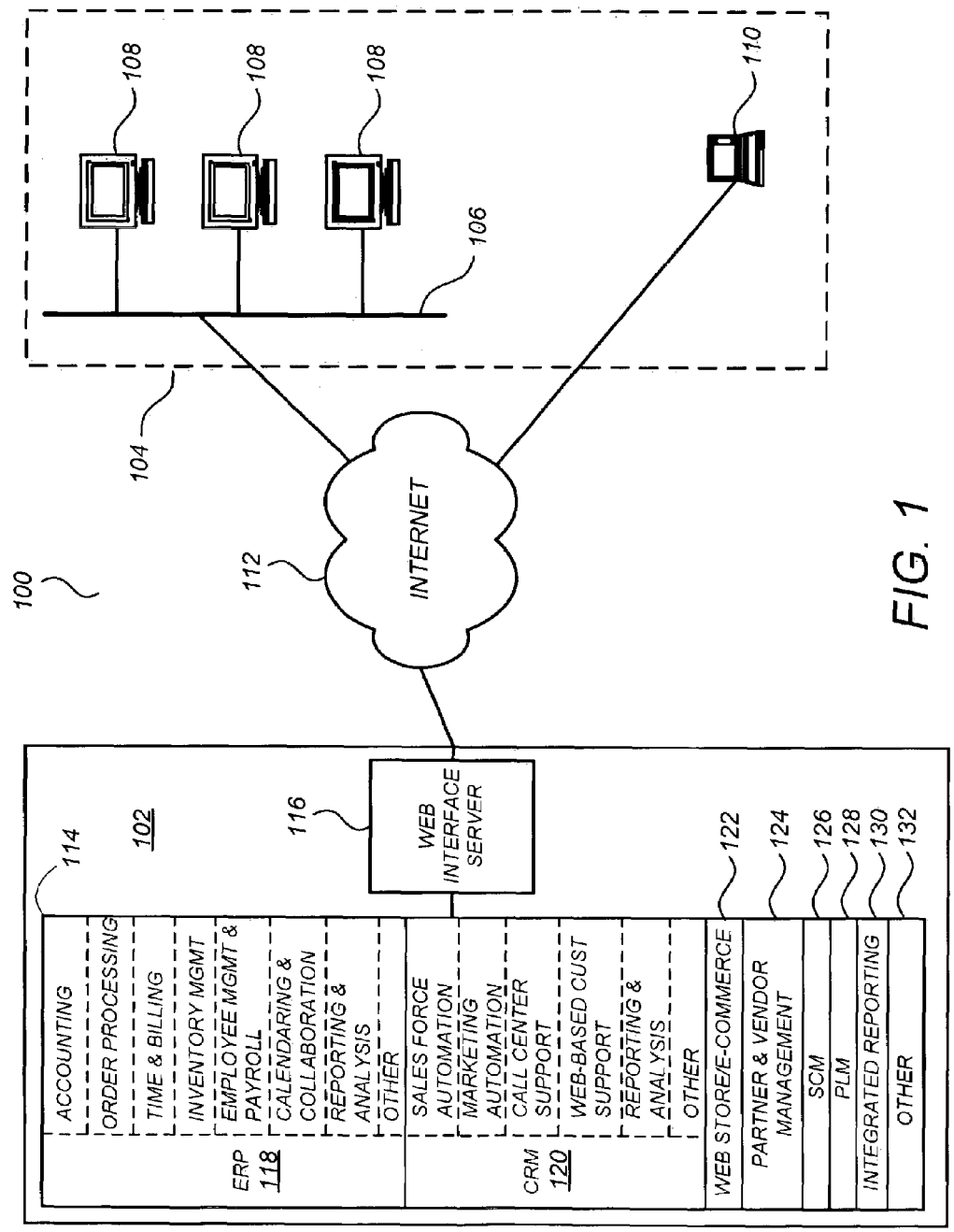
FIG. 1 illustrates a conceptual diagram of a computer network including an enterprise network and an integrated business system according to a preferred embodiment.

FIG. 1 illustrates a conceptual diagram of a network 100 including an integrated business system 102 and an enterprise network 104 in accordance with a preferred embodiment. Enterprise network 104 is associated generally with a business enterprise that may be as small as a single-employee sole proprietorship or as large as a multinational corporation having many different facilities and internal networks spread across many continents. Alternatively, and in accordance with the advantages of an application service provider (ASP) hosted integrated business system, the business enterprise may comprise no dedicated facilities or business network at all, provided that its end users have access to an internet browser and an internet connection. For simplicity and clarity of explanation, the enterprise network 104 is simply represented by an on-site local area network 106 to which a plurality of personal computers 108 is connected, each generally dedicated to a particular end user although such dedication is not required, along with an exemplary remote user computer 110 that can be, for example, a laptop computer of a traveling employee having internet access through a hotel, coffee shop, a public Wi-Fi access point, or other internet access modality. The end users associated with computers 108 and 110 may also each possess a personal digital assistant (PDA) such as a Blackberry, Palm, Handspring, or other PDA unit having wireless internet access and/or cradle-based synchronization capabilities. Users of the enterprise network 104 interface with the integrated business system 102 across the Internet 112.

Integrated business system 102, which is preferably hosted by a dedicated third party ASP, comprises an integrated business server 114 and a web interface server 116 coupled as shown in FIG. 1. It is to be appreciated that either or both of the integrated business server 114 and the web interface server 116 may actually be implemented on several different hardware systems and components even though represented as singular units in FIG. 1. Integrated business server 114 comprises an ERP functionality as represented by ERP module 118, and further comprises a CRM functionality as represented by CRM module 120. It is to be appreciated that identification herein of business functionalities with modules does not limit the scope of the preferred embodiments to segregated units thereof. In many preferred embodiments the ERP module 118 may share methods, libraries, databases, subroutines, variables, etc., with CRM module 120, and indeed ERP module 118 may be intertwined with CRM module 120 into a larger integrated code set without departing from the scope of the preferred embodiments.

It is to be appreciated that FIG. 1 is a simplified conceptual illustration presented so as to clearly describe the preferred embodiments herein. A variety of computing, storage, and networking hardware associated with the enterprise network 104 and the integrated business system 102, such as e-mail servers, databases, application servers, internet gateways, internal and external routers, security devices, internet service provider facilities, and related software protocols and methods necessary for operation are known in the art and need not be detailed here. Examples of such known computing, storage, and networking hardware can be found, for example, in US2002/0152399A1 and US2002/0169797A1, which are incorporated by reference herein.

Similarly, in view of the present disclosure, a person skilled in the art would be able to construct software packages capable of achieving the business data communication and presentation functionalities described herein without undue experimentation, using publicly available programming tools and software development platforms. It is preferred, however, to use programming tools and software development platforms that are compatible with recent versions of Microsoft's Internet Explorer browser and/or AOL's Netscape Navigator that support style sheets, scripting, JavaScript 1.5, and Dynamic HTML (DHTML). Generally speaking, the functionalities described herein are better achieved on the newest-available browser platforms. Known programming techniques that can be used to achieve the functionalities described herein can be found, for example, in Ray, D. and Ray, E., *Mastering HTML and XHTML*, SYBEX, Inc. (2002), and in Goodman, D., *JavaScript Bible: Gold Edition*, Hungry Minds, Inc. (2001). Security considerations can also be accommodated using known methods based, for example, on HTTPS (Hypertext Transfer Protocol Secure), a secure version of HTTP using certificates that can uniquely identify the server and the client and that encrypt all communication between them.

According to one preferred embodiment, the integrated business system 102 is similar to one used by NetLedger, Inc. of San Mateo, Calif. providing the hosted business services NetSuite™, Oracle® Small Business Suite, NetCRM™, and NetLedger™ Advanced Accounting, descriptions of which can be found at www.netledger.com. In a preferred embodiment similar to NetSuite™, the ERP module 118 comprises an accounting module, an order processing module, a time and billing module, an inventory management module, an employee management and payroll module, a calendaring and collaboration module, a reporting and analysis module, and other ERP-related modules. The CRM module 120 comprises a sales force automation (SFA) module, a marketing automation module, a contact list module (not shown), a call center support module, a web-based customer support module, a reporting and analysis module, and other CRM-related modules. The integrated business server further 114 further provides other business functionalities including a web store/e-commerce module 122, a partner and vendor management module 124, and an integrated reporting module 130. These functionalities are seamlessly integrated and executed by a single code base accessing one or more integrated databases as necessary. In another preferred embodiment, an SCM module 126 and PLM module 130 is provided. Web interface server 116 is configured and adapted to interface with the integrated business server 114 to provide the web-based user interfaces with end users of the enterprise network 104.

In an alternative preferred embodiment (not shown), one or more of the above business modules may be implemented by functionally separate servers and/or platforms that communicate with each other and with an integration server (not shown) over a LAN, a WAN, or the Internet. Protocols that may be used to facilitate inter-server communications include smbXML and qbXML.

Figure 2:
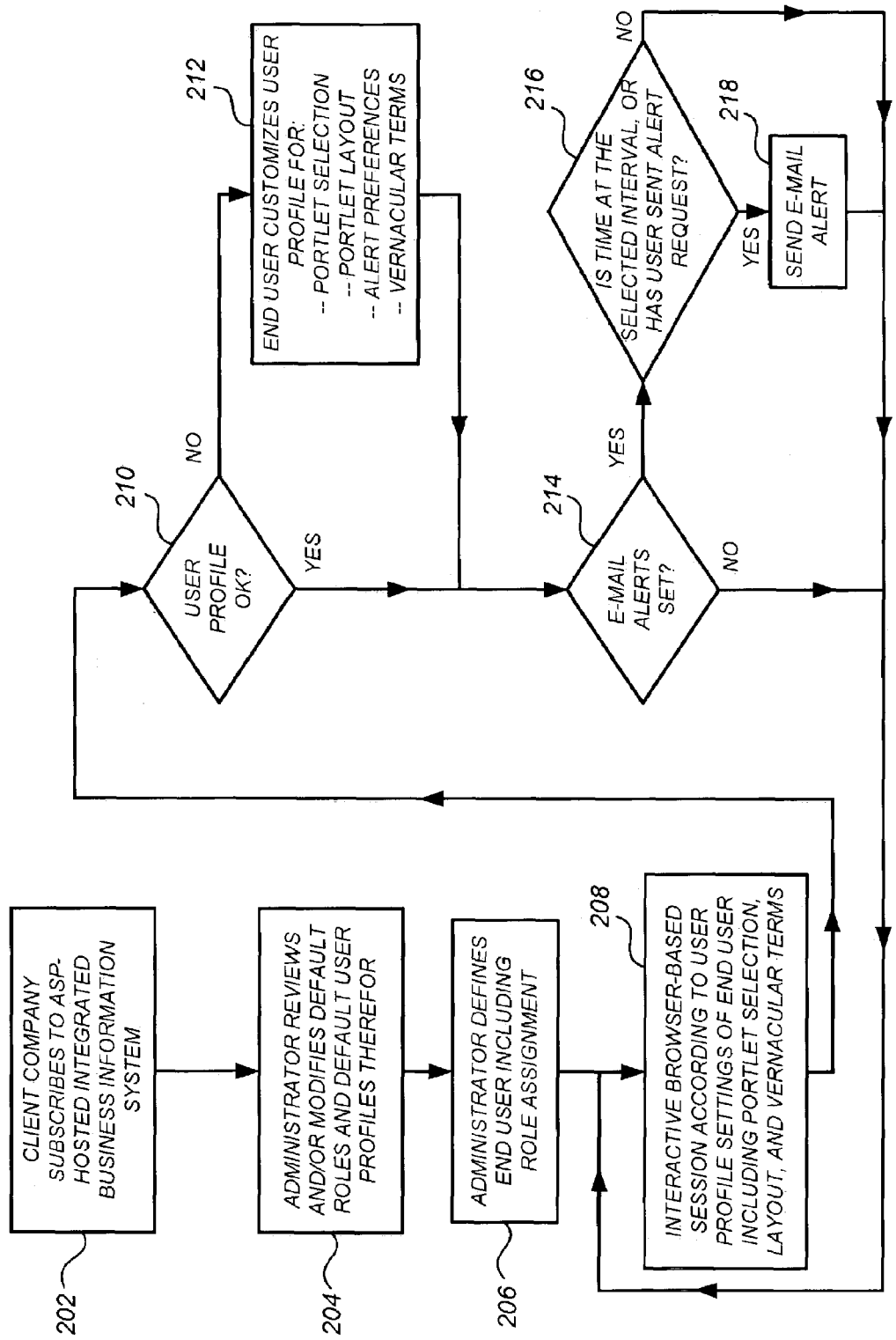
FIG. 2 illustrates steps for concise communication of business information to an end user according to a preferred embodiment.

FIG. 2 illustrates steps for concise communication of business information to an end user according to a preferred embodiment. At step 202, the client company subscribes to an ASP-hosted integrated business information system. At step 204, an administrator who is usually, be not required to be, an employee of the client company reviews and/or modifies the default roles and the default user profiles for those roles. According to a preferred embodiment, the default roles are preselected by the ASP system designers to appeal to a widest variety of business enterprise models while still having useful and specific distinctions between the roles. When properly preselected by the ASP system designers, an optimally minor amount of company-based customization and user-based customization is required. Administrators can also add roles to the enterprise as needed, building upon and/or picking and choosing from other predefined roles provided by the ASP. In one preferred embodiment, it has been found that the following selection of ASP-predefined roles provides good results: administrator; CEO; hands-on CEO; bookkeeper; marketing manager; sales manager; sales person; support manager; support person; store manager; warehouse manager; and general employee.

At step 206, the administrator defines an end user by entering their relevant information, usually including at least an e-mail address and a job title or department title, into the integrated business system. The administrator assigns at least one role to the end user relevant to their position in the company. In the event that more than one role is assigned, the permissions and accesses of the end user are selected as a logical union of those for each role. For user preferences and vernacular settings, a primary role is selected at those settings are assigned to the user profile of the end user.

At step 208, the user logs onto the integrated business system 102 from any thin-client computer having intranet or Internet access thereto. The end user interacts with the integrated business system 102 according to settings in the user profile that include portlet selection, portlet arrangement, and business vernacular settings. If the end user desires a change in one or more of these settings (step 210), they can enter into a customization page either using a tab/menu selection or an on-page link selection provided in a user customization portlet window, and change their settings to the extent consistent with the user's permissions (step 212).

If the user profile dictates that e-mail alerts are active (step 214), an electronic mail message is transmitted to the user (step 218) containing business information as described further infra if either (i) a predetermined interval has elapsed, or (ii) the end user has sent an affirmative request to the integrated business system 102 for an e-mail alert (step 216). Steps 214-218 generally occur regardless of whether the end user is currently logged onto the system or not. The e-mails may be in graphical form in a manner that emulates the layout within the browser window 302, or may be strictly text-based as determined by the user profile. In an alternative preferred embodiment, the integrated business system 102 restricts all electronic mail alerts to text-only format, so as to ensure efficient delivery and receipt by almost all types of e-mail systems, PDA displays, and the like.

Figure 3:
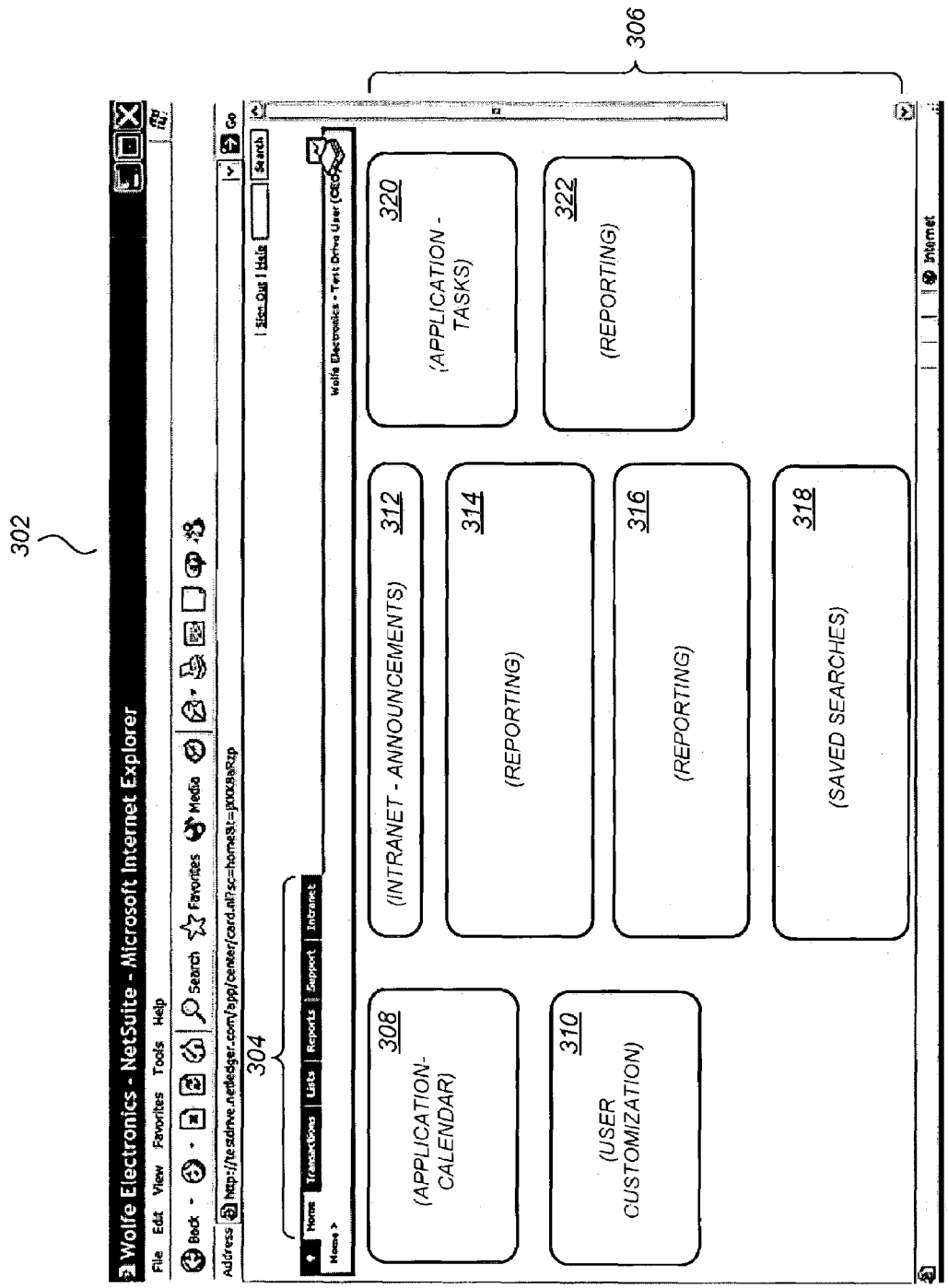
FIG. 3 illustrates a conceptual diagram of a home page/dashboard of an interactive browser-based user interface according to a preferred embodiment.

FIG. 3 illustrates a conceptual diagram of a home page/dashboard of an interactive browser-based user interface according to a preferred embodiment as displayed in a browser window 302. The home page comprises a plurality 306 of portlets and a plurality 304 of tabs pointing to different interactive windows/pages offered by the integrated business system 102. Portlets 306 comprise: a calendar application portlet 308 that windows and links to calendar module; a user customization portlet 310 comprising at least one link to a user customization page; an announcements portlet 312 displaying current company announcements or other information from postings on the company's intranet; reporting portlets 314, 316, and 322 described further infra; a saved searches portlet 318 displaying up-to-date results for one or more saved search requests, including drill-down links to underlying data; a tasks application portlet 320 windowing and linking to a tasks module that provides appointment-making, reminding, and other known functionalities.

According to a preferred embodiment, the selection and arrangement of the portlets 306 is user-customizable. The portlet windows are interchangeable in position, the user being able to give a more-prominently-viewed or less-prominently viewed spatial location to any particular portlet. In one particularly appealing preferred embodiment, the portlet windows may be shifted in real-time using a click-and-drag technique. In another particularly appealing preferred embodiment, the portlet windows may be shrunken, expanded, reshaped (e.g., into a circle, triangle, or trapezoid with texts and fonts being preserved in shape and size but rearranged to fill out the portlet area), or even distorted (e.g., into a trapezoidal shape instead of rectangular with the text itself being distorted) by clicking and dragging on corners thereof depending on the desires of the user. The ASP designer choices, however, for the default user profiles based on company roles are selected such that users who do not wish to customize their home page can still access their information in a substantially convenient manner.

FIG. 4 illustrates a selected close-up view of certain ones of the portlets 306 within the browser window 302 of FIG. 3, in particular focusing on the reporting portlets 314, 316, and 322 and the task application portlet 320. Each reporting portlet displays at least one business result along with a link to data underlying that business result. It is to be appreciated that business results can comprise statuses, intermediate results, etc., and are not required to be associated with "end results" only. However, it is believed that best use of the system is achieved when the business results displayed are those that are at a high enough level of abstraction to be readily appreciated by the user in a single glance, while also being at a low enough level of abstraction so as to be actionable by the user on either a long term or a short term basis.

By way of example, result portlet 314 comprises a cashflow elements snapshot listing key accounting metrics including accounts payable, accounts receivable, and past due invoice amounts at different amount of lateness. Result portlet 316 comprises a bar chart of customer satisfaction levels. Result portlet 322 comprises a text display of customer satisfaction levels. Preferably, for each set of business results that is amenable to both graphical and textual formats, the user is permitted to choose the desired format in their user profile. According to the desires of the user, the particular business results being displayed in the results portlets may be selected from predetermined "canned" reports configured by the ASP designers, or may be custom, user-configured reports. As indicated in FIG. 4, business results that are beyond user-settable thresholds are displayed in highlighted form (e.g., in bold type) to attract the end user's attention.

In one preferred embodiment, the portlets and the business results therein are refreshed upon selection of any link thereon via query to the integrated business information system 102. In an alternative preferred embodiment, the business results are updated at regular time intervals according to a setting in the user profile. In still another preferred embodiment, portlets are updated on an individual basis depending on the nature of their contents. By way of example, portlets showing slowly-changing data (such as a search results portlet identifying new employees this month) are refreshed only once per hour or upon a click of a link therein, while portlets showing fast-changing data (such as orders taken, customer service call numbers, or the company's stock price) are refreshed once every thirty seconds. In still another preferred embodiment, mouse rollover of a portlet is used to trigger a refresh via query to the integrated business system 102. This can include a small time threshold prior to refreshing, e.g., a two-second delay, such that if the mouse cursor is being moved quickly over a portlet window on its way to something else on the screen there will be no refresh, but if the mouse cursor stays on a portlet for more than that time threshold (indicating, for example, that the user is dwelling on that information) then the refresh is triggered. Per-portlet refreshing can be accomplished using known hidden IFRAME technology that allows individual items on a web page to be updated without a full-page refresh cursor commit.

Figure 6:
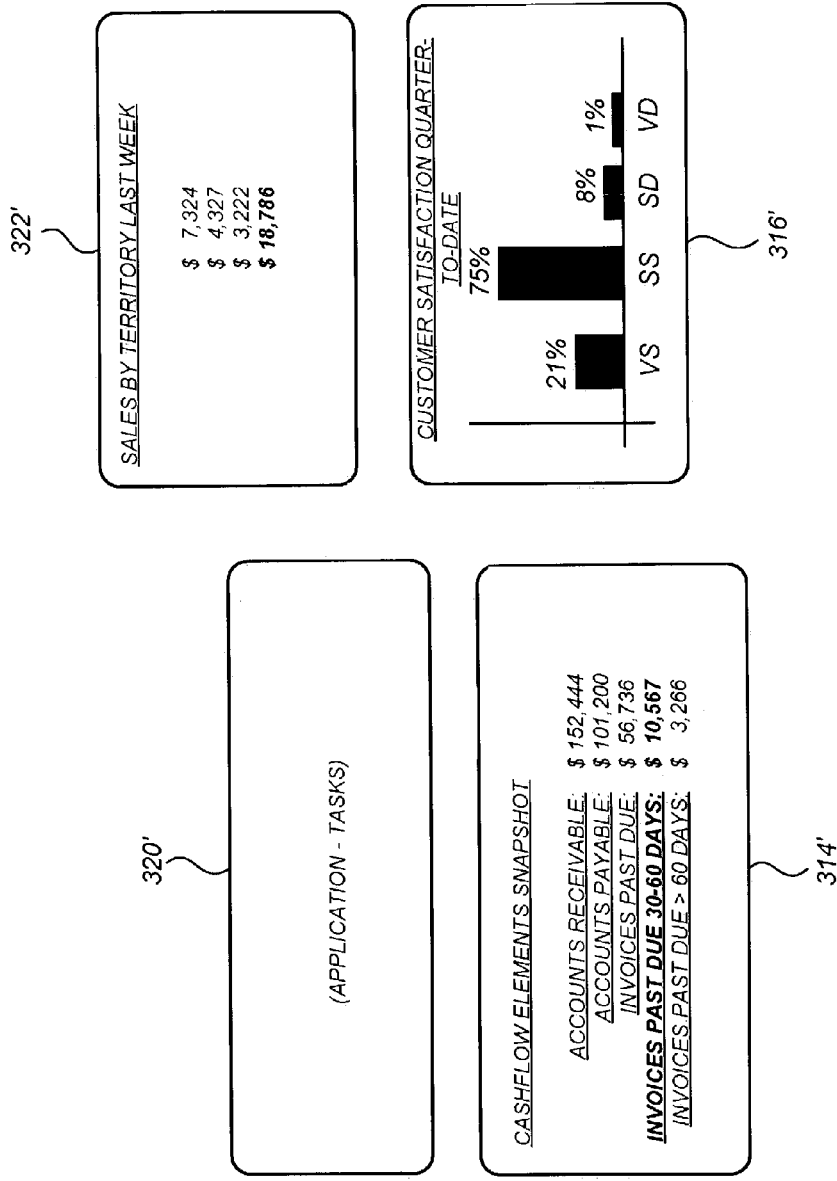
FIG. 6 illustrates the portlet windows of FIG. 4 as rearranged by the user according to a preferred embodiment.

FIG. 5 illustrates a text-based electronic mail message 502 transmitted to the end user's e-mail account by the integrated business system 102. As indicated in FIG. 5, the text sections 504, 506, 508, and 510 are sequentially arranged according to the order of the corresponding portlet windows 314, 316, 320, and 322, respectively, within the browser window 302. It has been found that this ordering is particularly desirable, especially where the sequential order of the text in the electronic mail message 502 emulates a glancing pattern of the user viewing the browser window 302. As illustrated in FIG. 6 and FIG. 7, when the user changes the arrangements of the portlet windows within the browser window, the ordering of the text in the electronic mail message is changed accordingly.

Figure 8:
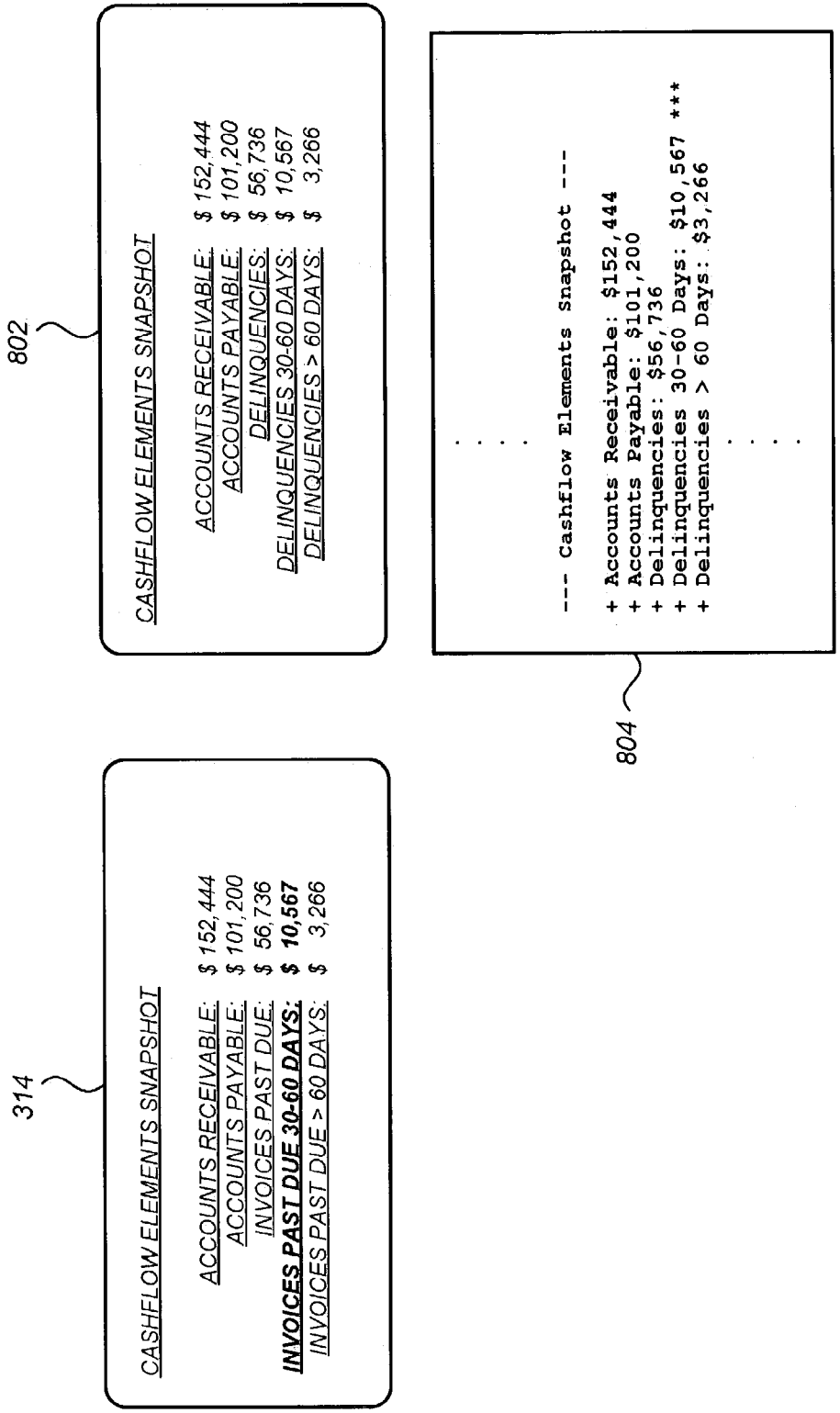
FIG. 8 illustrates portlet windows displaying the same business information using data labels having different business vernacular terms, and a corresponding portion of an electronic mail message transmitted according to a preferred embodiment.

FIG. 8 illustrates portlet windows 314 and 802 taken from different user displays, the portlet window 314 being taken from a CEO display, the portlet window 802 taken from the display of a different role such as sales manager. Notably, the portlets 314 and 802 are displaying the same "canned" report and therefore are displaying the same business information. However, in accordance with a preferred embodiment, the portlet 802 substitutes the role-based desired business vernacular term "delinquencies" for the term "invoices past due." Also shown in FIG. 8 is a relevant section 804 of the electronic e-mail alert sent to the sales manager, also incorporating the desired business vernacular term for that role.

Figure 9:
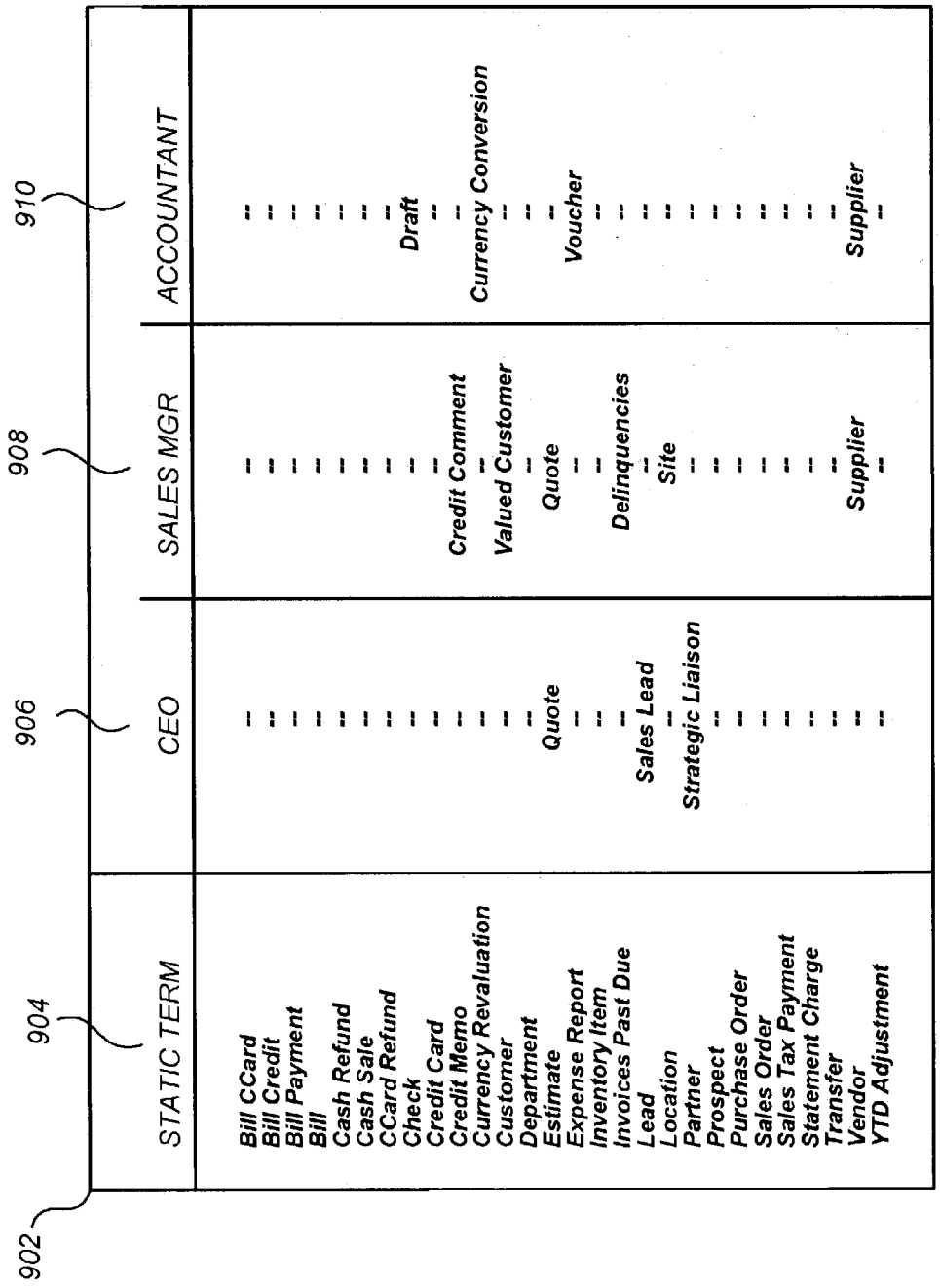
FIG. 9 illustrates a conceptual example of a terminology map according to a preferred embodiment.

FIG. 9 illustrates a conceptual example of a terminology map 902 according to a preferred embodiment, comprising a set 904 of static business terms used by default throughout the integrated business system 102, and further comprising role-based vernacular terms 906, 908, and 910 for the CEO, sales manager, and accountant roles, respectively. Additional terminology tables (not shown) may be maintained for specific users who wish to depart from the default vernacular settings associated with their primary role. In other preferred embodiments, customized vernacular terminology maps may be provided based on geography, demographic group, or any of a variety of other groupings.

Figure 10:
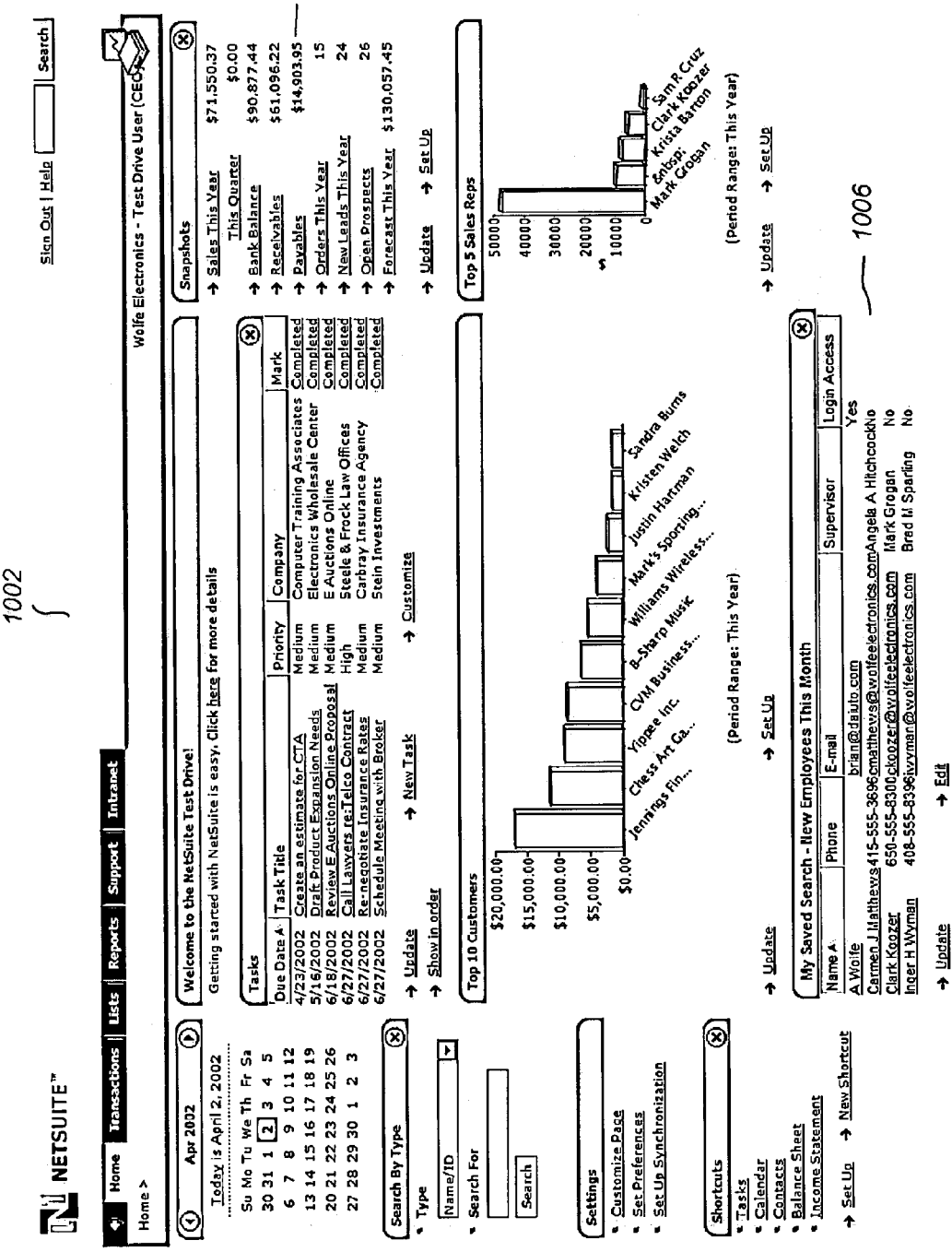
FIG. 10 illustrates a home page/dashboard display of an interactive browser-based user interface according to a preferred embodiment.

FIG. 10 illustrates a home page/dashboard display 1002 of an interactive browser-based user interface according to a preferred embodiment. Home page 1002 includes a reporting portlet 1004 ("Snapshots") comprising business results spanning both the ERP module 118 and CRM module 120 of FIG. 1, supra. Home page 1002 further comprises a saved search results portlet 1006 ("My Saved Search—New Employees This Month"), a navigation assistance portlet ("Shortcuts"), a user customization portlet ("Settings"), a search application portlet ("Search by Type"), a calendar application portlet ("Calendar"), a tasks application portlet ("Tasks"), and business reporting portlets "Top 10 Customers" and "Top 5 Sales Reps". More generally, FIGS. 10-18 illustrate "screen dumps" taken from an ordinary internet browser (Microsoft Internet Explorer 6.0) logged into NetLedger, Inc.'s NetSuite™ product, supra, and converted into black-and-white drawings for filing herewith.

Figure 12:
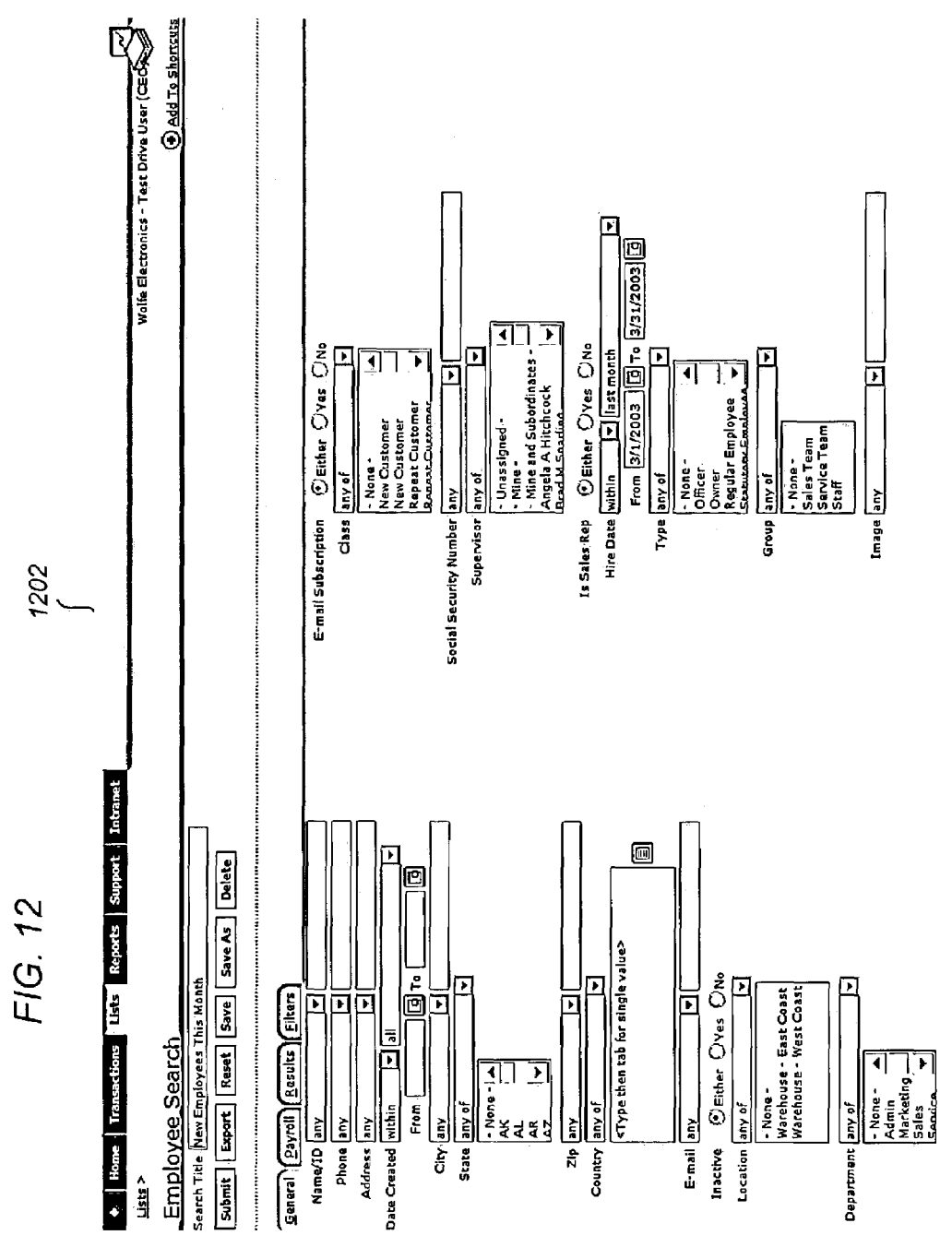
Figure 13:
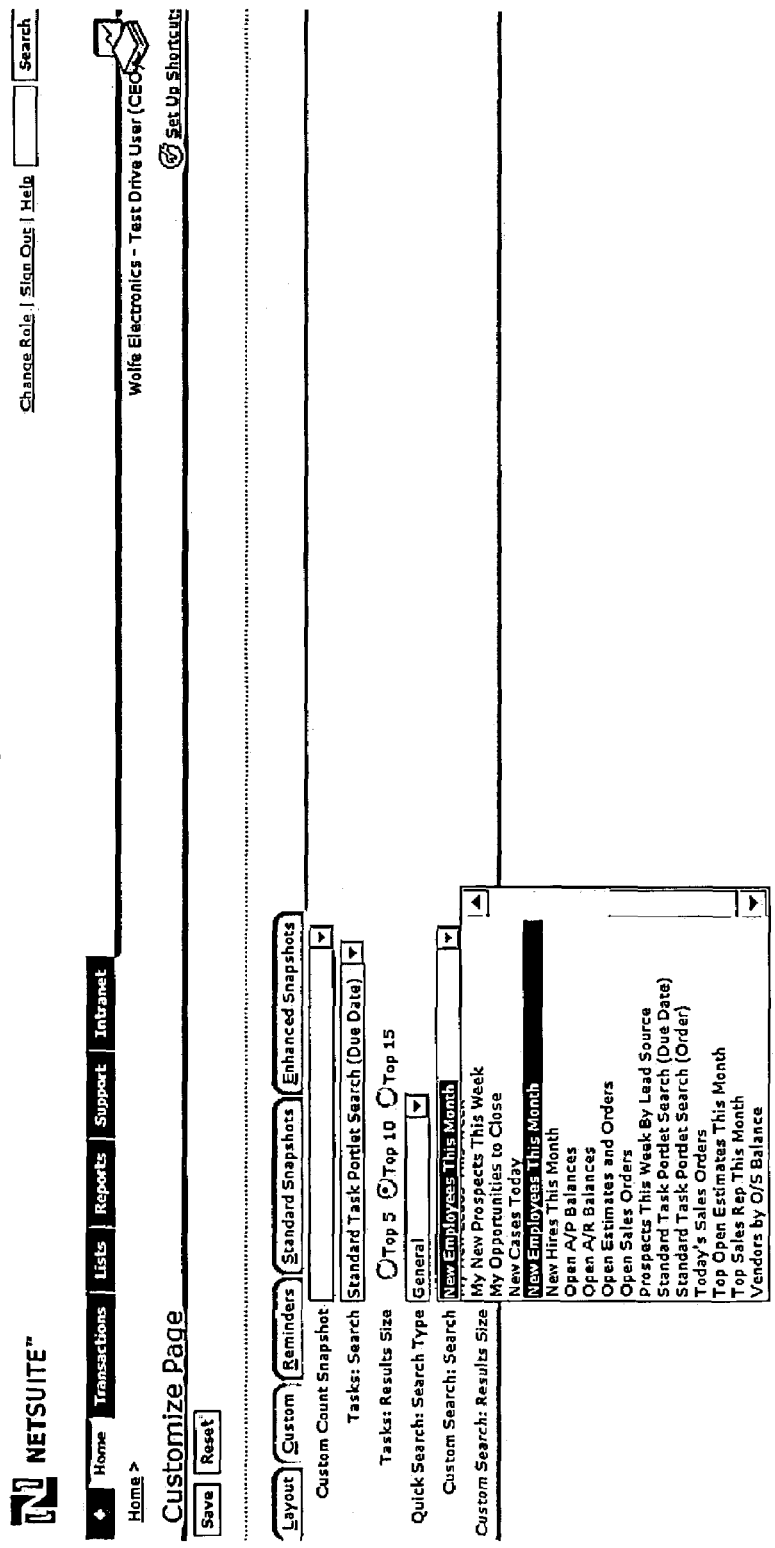
FIG. 13 illustrates a user profile customization screen including a saved search selection screen associated with the saved search portlet of FIG. 10.

FIG. 11 illustrates business data underlying a business result displayed in a result portlet of FIG. 10, in particular displaying an A/P Register page 1102 that resulted from a single user click of the "Payables" result label/link shown in report portlet 1004 of FIG. 10. FIG. 12 illustrates a search parameter entry screen 1202 associated with the saved searches portlet 1006 of FIG. 10. FIG. 13 illustrates a user profile customization screen 1302 having a saved search selection list ("Custom Search") interfacing in a click-and-select manner.

Figure 14:
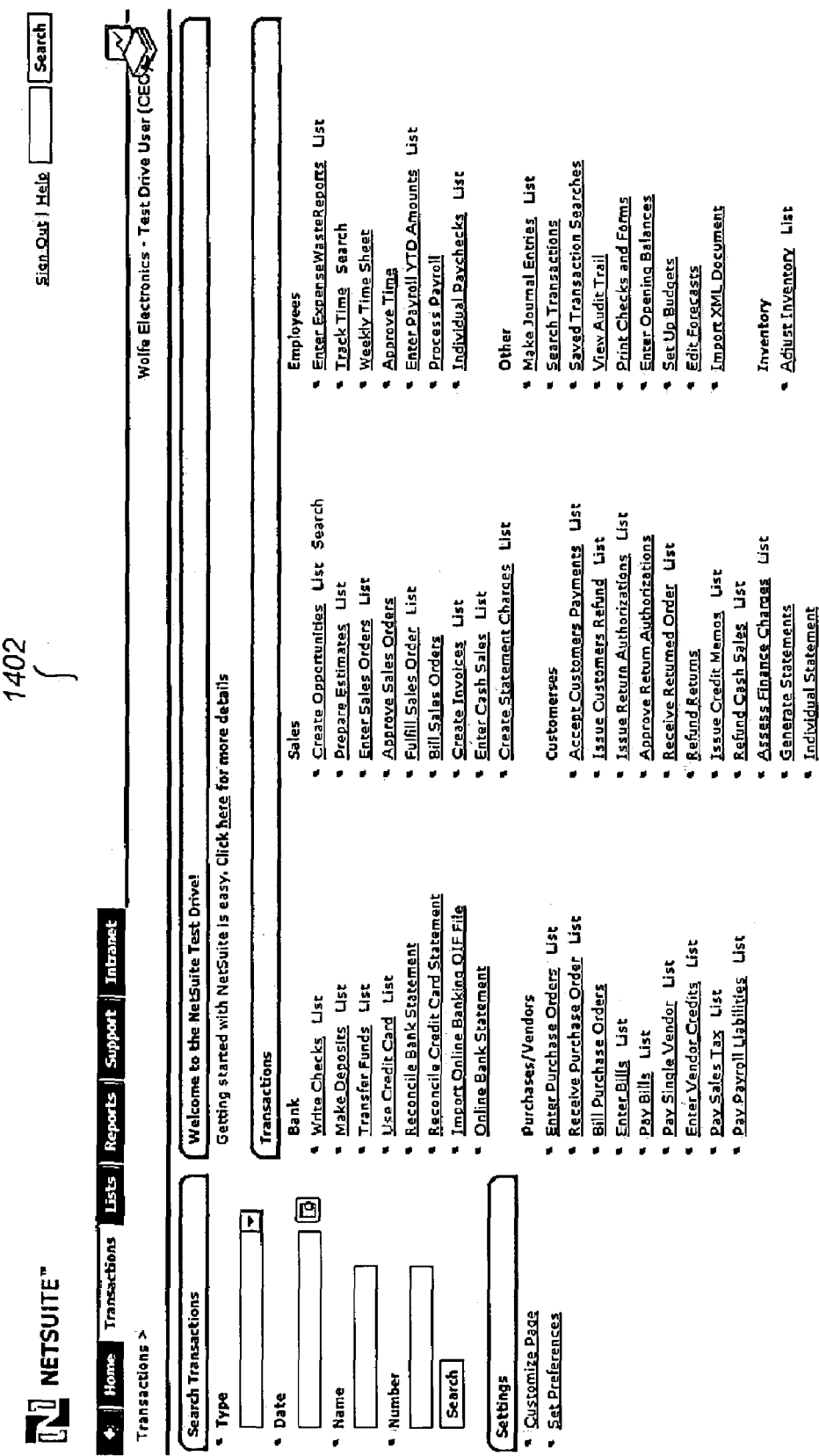
FIG. 14 illustrates a transaction page of an interactive browser-based user interface to an integrated business system according to a preferred embodiment.

FIG. 14 illustrates a transaction page 1402 of the interactive browser-based user interface, listing a variety of transaction links available to the end user, who is identified thereon as having the CEO role. FIG. 15 illustrates a transaction page 1502 for a different end user (Administrator, see 1504), including a set of transaction links 1506 that are not exposed to the CEO role. As indicated by FIG. 14 and FIG. 15, in accordance with default access permissions set by the ASP designers (and optionally changeable by the Administrator), end users are usually shown a subset of available links to differing functionalities according to their role. As per the example of FIGS. 14 and 15, it is generally not worthwhile (or perhaps even dangerous due to training issues) to expose Inventory Adjustment functionalities to a CEO role. Administrators will usually have access to all possible links, out of the technological necessity so all users need to be supported.

Figure 16:
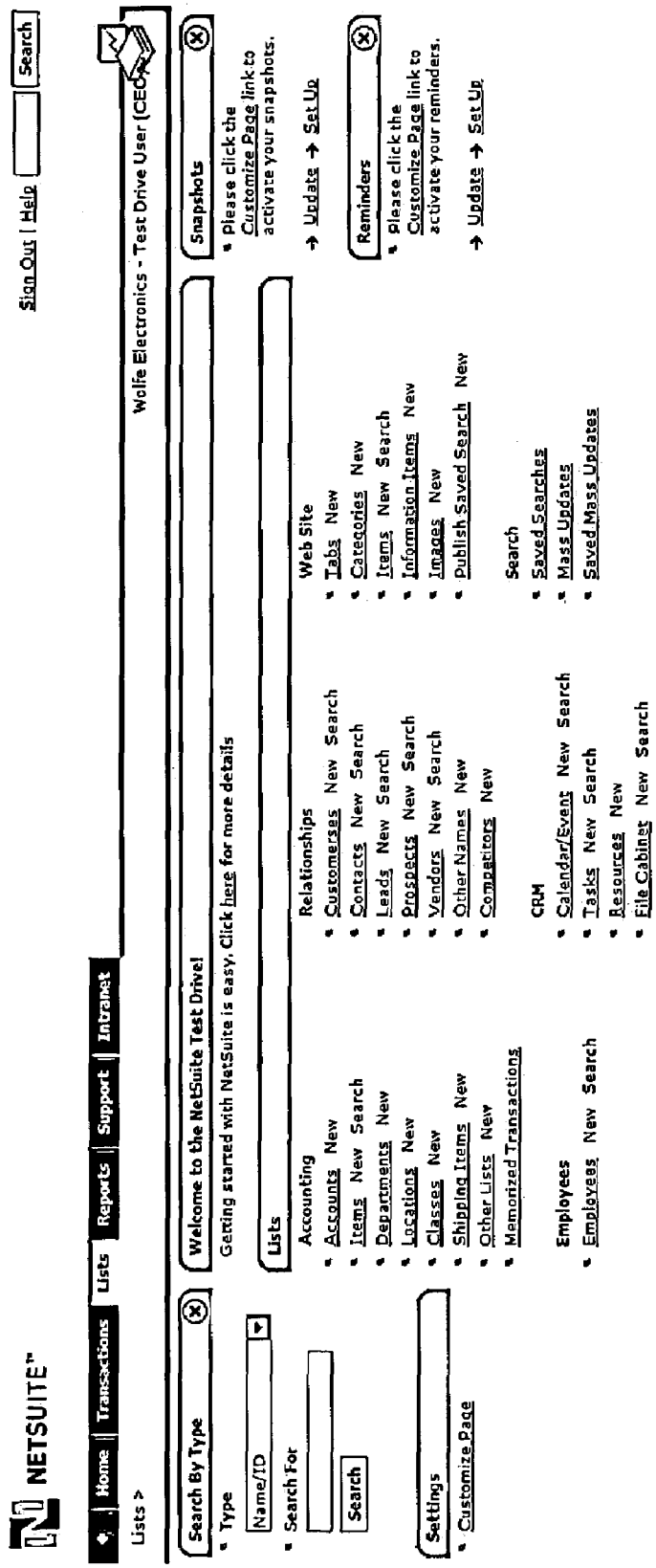
FIG. 16 illustrates a lists page of an interactive browser-based user interface to an integrated business system according to a preferred embodiment.

FIG. 16 illustrates a lists page 1602 of the interactive browser-based user interface for the CEO role. FIG. 17 illustrates a reports page 1702 of the interactive browser-based for the CEO role.

Figure 18:
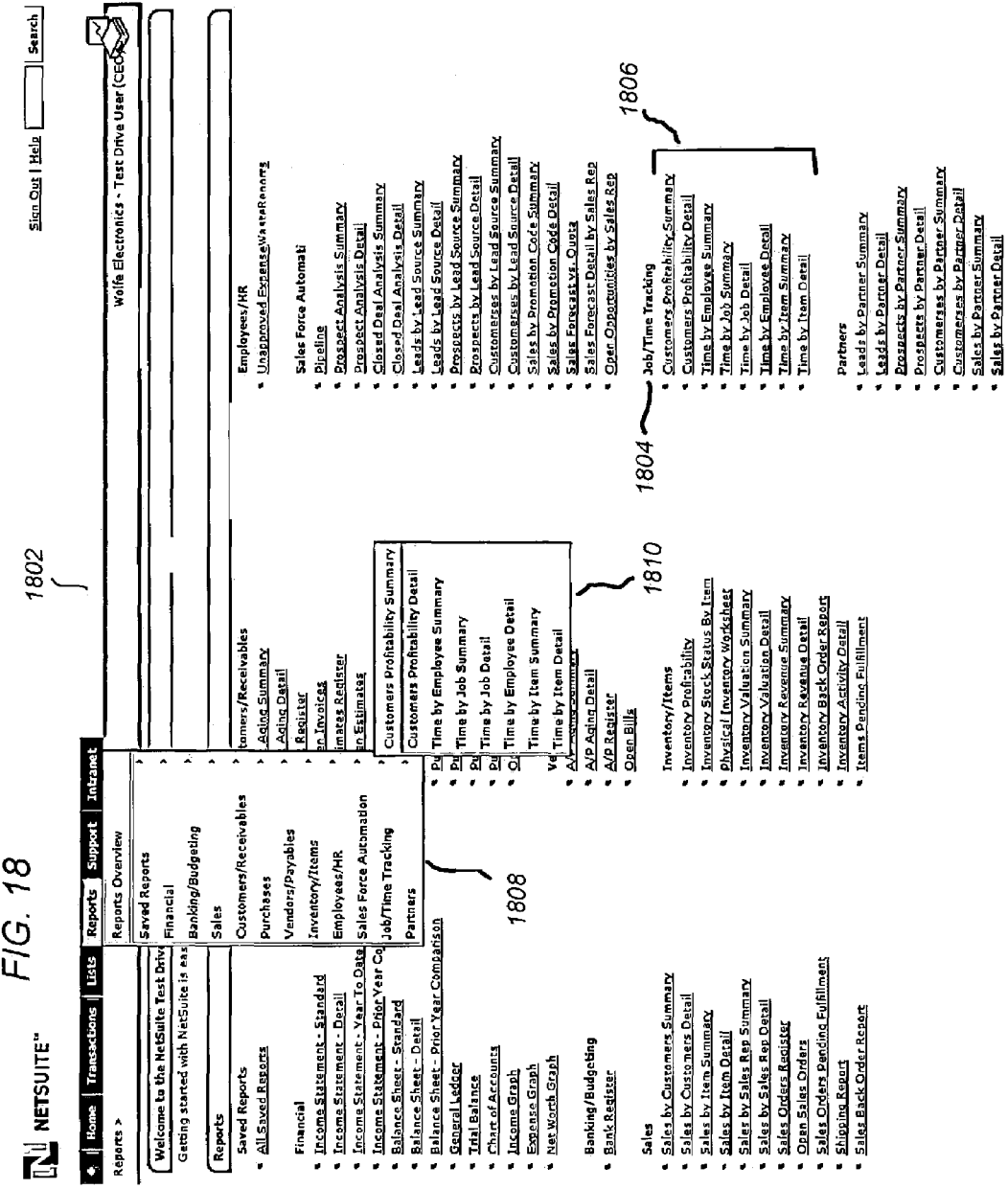
FIG. 18 illustrates the reports page of FIG. 17 as a user is invoking a multilevel pull-down menu.

FIG. 18 illustrates a reports page 1802 similar to the reports page 1702 of FIG. 17, except that the user has invoked multilevel pull-down menus. According to a preferred embodiment, such multilevel pull-down menus are provided that mirror the layout of the categories and links on the associated page. Thus, for example, the reports page 1802 includes report categories such as a Job/Time Tracking category 1804, which in turn comprise report links 1806. As indicated in FIG. 18, a first pull-down menu 1808 is provided that lists the report categories in the same order as they are laid out on the page, each member of which has a submenu (e.g., submenu 1810 for the Job/Time Tracking member) listing the associated report links. Preferably, the pull-down menus are rollover-activated as a default setting, although the user may change this setting when they customize their user profile. Multilevel pull-down menus associated with each of the other page tabs (Home, Transactions, Links, etc.) can be invoked regardless of which particular page is being displayed. Advantageously, the user can readily view all or substantially all of the available links from any of the pages without needing to "commit," i.e., without needing to click on a link and wait for a new web page to load. This enhances the user's ability to perceive the organization and capabilities of the integrated business system.

Figure 19:
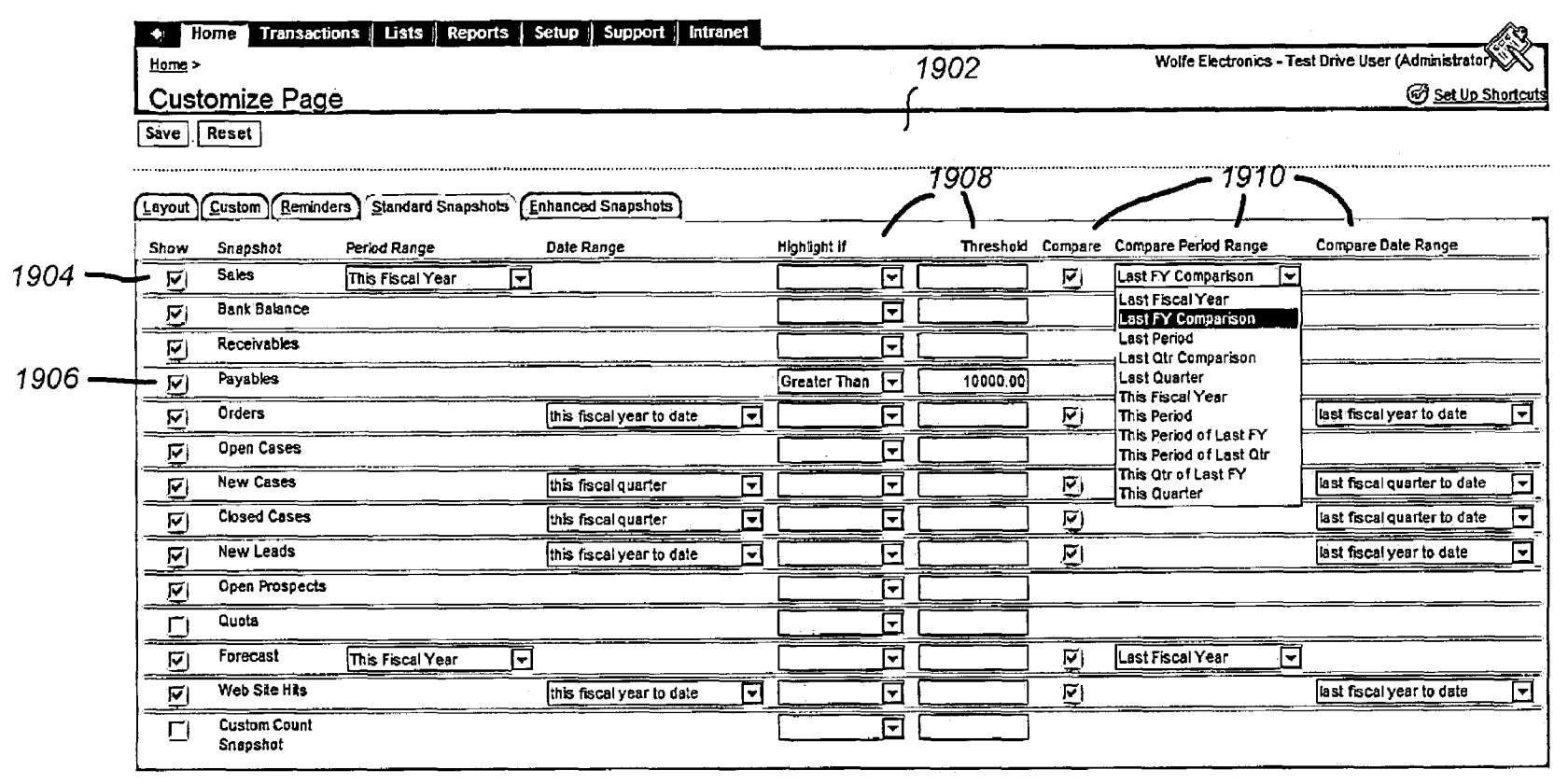

FIG. 19 illustrates a user profile customization page including a report portlet customization page 1902 according to a preferred embodiment. The user may select from a variety of "canned" business result metrics reports or custom business result metrics to be displayed, such as a "Sales" business result metric 1904 and a "Payables" business result metric 1906. Easy-to-use pull-down and value entries 1908 allow the user to enter desired threshold values above or below which trigger a highlighted result. Check boxes and time point/period pull-down menus 1910 allow for the easy input of those business result metrics for which the user would like to display past values for comparison.

FIG. 20 illustrates a reporting portlet 2002 corresponding to entries displayed in the portlet customization page of FIG. 19. Thus, as indicated in FIGS. 19-20, the end users can not only set highlight thresholds, but can also set any business result metric for comparative display, e.g., to display both this quarter's Sales and last quarter's Sales, or to display this Month's number of new leads next to Last Month-to-Date's number of new leads. Users can compare the results of any date range against any other date range. The two results appear next to each other for easy comparison.

Although in some preferred embodiments the integrated business server is kept on-site at the business enterprise and managed by local information technology personnel, there are several advantages to using a third party ASP to host the integrated business system. One key advantage is reduced equipment costs, wherein the client company simply pays a fixed and/or usage-based monthly fee, with hardware expenditures being limited essentially to thin-client systems and networking hardware. Other advantages include automatic and inherent system upgrading as provided by the ASP, the client always enjoying the newest version of the integrated business system. This is especially useful in view of the many advances being made by browser vendors. Instead of waiting for the onsite IT department to eventually learn and harness newer browser capabilities into the user interface, which could take months or years, a business enterprise using the third-party ASP to manage their integrated business system gains a business advantage in that that the ASP's staff is usually on top of these browser advancements immediately, since they are intrinsically "in the business," and can harness the newer browser capabilities within weeks/months instead of months/years. Still other advantages include fast security updates, which may be especially useful in view of the many traveling off-site users that many businesses have.

Among the advantages of a customizable, portlet-based user interface with result thresholding and highlighting according to the preferred embodiments is virtually immediate drill-down analysis capabilities into crucial business performance metrics. For example, an executive may immediately recognize a particularly lucrative customer via a portlet showing a highlighted CRM metric, and then can instantly drill-down into the system to find out, for example, what that customer bought, who the company sales person was for that customer, what their business terms were, and the like with a view toward extending this knowledge to gain other such lucrative customers or to increasing the lucrativeness of other customers.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, although the alert messages supra were described as being provided in electronic mail format readable by a computer or PDA, in other preferred embodiments the alert messages can be provided in voice mail format, by mp3-encoded e-mail file attachment, by singular postings to secure bulletin boards or web pages, by secure video-based communication means, by secure satellite radio such as custom XM radio channels, or using any of a variety of other messaging systems.

By way of further example, the preferred embodiments may be used to communicate metrics of interest that might not traditionally be associated with ERP or CRM systems of a business enterprise, ranging from metrics of the financial performance of charities supported by the business enterprise, to metrics of how many staff employees are still using their on-site terminals during the late afternoon hours, to metrics of how many off-intranet web sites are being accessed by employees, or a variety of other items of interest.

By way of even further example, although described supra in terms of business-term nomenclatures, the features and advantages of user-specific or group-specific vernacular customization are extendible to other scenarios, such as the takeover of a smaller company by a larger company. In this case, the vernacular customization feature can be leveraged to keep the smaller company's name on the user interfaces for their end users, even though they are actually communicating and interacting with the integrated business system of the larger company. Therefore, reference to the details of the preferred embodiments are not intended to limit their scope, which is limited only by the scope of the claims set forth below.

What is claimed is:

1. An integrated business information system for serving a business enterprise having an enterprise network, comprising:

a plurality of business computing modules including at least one Enterprise Resource Planning (ERP) module and at least one Customer Relationship Management (CRM) module, said business computing modules being located at a central location and hosted by an application service provider (ASP);

an interface server coupled to said business computing modules and to the Internet, said interface server facilitating browser-based access between an end user on said enterprise network and said business computing modules, said interface server causing display of a browser window to said end user including a simultaneous display within said browser window of a plurality of portlet windows, said portlet windows being selected and arranged according to a user profile for that end user that is user-customizable, said plurality of portlets comprising:

a first reporting portlet displaying a first business result metric derived from at least one of said ERP or CRM modules, said first reporting portlet further displaying with said first business result metric a first report access link associated with said business result metric that, when selected by the end user, invokes a display of underlying business data used to derive said first business result metric, a second reporting portlet displaying a second business result metric derived from the other of said ERP or CRM modules, and a first application portlet comprising at least one application access link that, when selected by the end user, invokes a browser-based interactive session with one of said ERP or CRM modules; and an electronic mail server coupled to said interface server, said electronic mail server transmitting an electronic mail message to an e-mail account of the end user, said electronic mail message communicating said first and second business result metrics, wherein said user profile for said end user is stored in said interface server and comprises an e-mail alert format preference, said e-mail format alert preference defining whether the end user prefers a graphical format over a text-only format for said electronic mail message, wherein said electronic mail message is formed from a markup language so as to emulate an appearance of said browser window when invoked by the end user and when said e-mail format alert indicates said graphical format preference, and wherein said electronic mail message is a text-only message when said e-mail format alert indicates said text-only format preference, said text-only message comprising text sections sequentially ordered in a manner matching an order in which said portlet windows are arranged in said browser window according to said user profile of said end user.

2. The integrated business information system of claim 1, wherein said interface server and said electronic mail server are hosted by said ASP.

3. The integrated business information system of claim 2, wherein said plurality of business computing modules comprises each of the following ERP modules: accounting, order processing, time and billing, inventory management, employee management/payroll, and employee calendaring/collaboration.

4. The integrated business information system of claim 3, wherein said plurality of business computing modules comprises each of the following CRM modules: sales force automation (SFA), marketing automation, contact list, call center support, and web-based customer support.

5. The integrated business information system of claim 1, said electronic mail server sending a plurality of electronic mail messages at different times to the e-mail account of the end user communicating said first and second business result metrics, said user profile for said end user being stored in said interface server and comprising an e-mail alert timing preference defining pre-established periodic intervals at which said electronic mail messages are sent.

6. The integrated business information system of claim 1, said electronic mail server sending said electronic mail message responsive to a receipt by said interface server of an alert request from the end user.

7. The integrated business information system of claim 6, wherein said alert request comprises an electronic mail message sent from said e-mail account of the end user.

8. The integrated business information system of claim 6, wherein said alert request is input by the end user into one of said plurality of portlet windows.

9. The integrated business information system of claim 6, wherein said alert request originates from a personal digital assistant device of the end user.

10. The integrated business information system of claim 6, wherein said alert request originates from a telephone call placed by the end user.

11. The integrated business information system of claim 1, said user profile comprising a user-settable threshold value corresponding to each of said first and second business result metrics, said interface server causing said first and second business result metrics to be highlighted within their respective portlets if that business result exceeds its corresponding user-settable threshold, thereby informing the end user that said business result metric is beyond its associated user-settable threshold without requiring affirmative inquiry from the user when said browser window is being displayed.

12. The integrated business information system method of claim 1, said end user being assigned a predefined role relevant to said business enterprise, said predefined role being selected from a plurality of predefined roles each having an associated default user profile associated therewith, said user profile being variable from said default user profile by the end user by virtue of said user-customizability property thereof.

13. The integrated business information system of claim 12, said user profile including a terminology map, said terminology map comprising:

a plurality of static business terms fixedly associated with data records, transactions, or groups thereof within the integrated business system; and for each of said static business terms, an associated vernacular equivalent tuned for said end user;

wherein said vernacular equivalents are substituted for said static business terms in said browser window and in said electronic mail message.

14. The integrated business information system of claim 13, wherein said default user profile includes a default terminology map including vernacular equivalents tuned to said assigned predefined role.

15. The integrated business information system of claim 14, said plurality of static business terms including the term "estimate," said plurality of predefined roles including accountant, CEO, and sales manager, wherein said vernacular equivalents of "estimate" are assigned as (i) "quote" for the CEO role, (ii) "quote" for the sales manager role, and (iii) "estimate" or NULL EQUIVALENT for the accountant role.

16. The method of claim 13, wherein said vernacular equivalents are tunable based on end user groupings selected from the group consisting of role group, language group, geography group, demographic group, and salary group.

* * * * *